(12) United States Patent
Bunandar et al.

(10) Patent No.: US 11,700,078 B2
(45) Date of Patent: Jul. 11, 2023

(54) SYSTEMS AND METHODS FOR UTILIZING PHOTONIC DEGREES OF FREEDOM IN A PHOTONIC PROCESSOR

(71) Applicant: Lightmatter, Inc., Boston, MA (US)

(72) Inventors: Darius Bunandar, Boston, MA (US); Michael Gould, Boston, MA (US); Nicholas C. Harris, Boston, MA (US); Carl Ramey, Westborough, MA (US)

(73) Assignee: Lightmatter, Inc., Boston, MA (US)

( * ) Notice: Subject to any disclaimer, the term of this patent is extended or adjusted under 35 U.S.C. 154(b) by 0 days.

(21) Appl. No.: 17/383,509

(22) Filed: Jul. 23, 2021

(65) Prior Publication Data

US 2022/0029730 A1   Jan. 27, 2022

Related U.S. Application Data

(60) Provisional application No. 63/056,494, filed on Jul. 24, 2020.

(51) Int. Cl.
*H04J 14/04* (2006.01)
*H04B 10/50* (2013.01)
(Continued)

(52) U.S. Cl.
CPC .......... *H04J 14/04* (2013.01); *H04B 10/5051* (2013.01); *H04B 10/801* (2013.01); *H04J 14/02* (2013.01); *H04J 14/0279* (2013.01)

(58) Field of Classification Search
CPC ..... H04L 9/0869; H04L 9/001; H04L 9/0825; H04B 10/5561; H04B 10/516; H04B 10/25137; H04J 14/04

See application file for complete search history.

(56) References Cited

U.S. PATENT DOCUMENTS

| 3,872,293 A | 3/1975 | Green |
| 4,183,623 A | 1/1980 | Haines |

(Continued)

FOREIGN PATENT DOCUMENTS

| CA | 2300780 C | * 8/2007 | ......... G02B 6/29308 |
| CA | 2952102 C | * 9/2019 | ......... H04L 27/2636 |

(Continued)

OTHER PUBLICATIONS

International Search Report and Written Opinion from International Application No. PCT/US2015/034500, dated Mar. 15, 2016, 7 pages.

(Continued)

*Primary Examiner* — Abbas H Alagheband
(74) *Attorney, Agent, or Firm* — Wolf, Greenfield & Sacks, P.C.

(57) ABSTRACT

Systems and methods for increasing throughput of a photonic processor by using photonic degrees of freedom (DOF) are provided. The photonic processor includes a multiplexer configured to multiplex, using at least one photonic DOF, multiple encoded optical signals into a multiplexed optical signal. The photonic processor also includes a detector coupled to an output of an optical path including the multiplexer, the detector being configured to generate a first current based on the multiplexed optical signal or a demultiplexed portion of the multiplexed optical signal. The photonic processor further includes a modulator coupled to and output of the detector, the modulator being configured to generate a second current by modulating the first current.

19 Claims, 15 Drawing Sheets

(51) Int. Cl.
H04B 10/80 (2013.01)
H04J 14/02 (2006.01)

(56) References Cited

U.S. PATENT DOCUMENTS

| | | | |
|---|---|---|---|
| 4,567,569 A | 1/1986 | Caulfield et al. | |
| 4,592,004 A | 5/1986 | Bocker et al. | |
| 4,607,344 A | 8/1986 | Athale et al. | |
| 4,633,428 A | 12/1986 | Byron | |
| 4,686,646 A | 8/1987 | Goutzoulis | |
| 4,739,520 A | 4/1988 | Collins, Jr. et al. | |
| 4,809,204 A | 2/1989 | Dagenais et al. | |
| 4,849,940 A | 7/1989 | Marks, II et al. | |
| 4,868,803 A | 9/1989 | Sunagawa et al. | |
| 4,877,297 A | 10/1989 | Yeh | |
| 4,948,212 A | 8/1990 | Cheng et al. | |
| 5,004,309 A | 4/1991 | Caulfield et al. | |
| 5,077,619 A | 12/1991 | Toms | |
| 5,095,459 A | 3/1992 | Ohta et al. | |
| 5,117,099 A | 5/1992 | Schmidt | |
| 5,254,957 A | 10/1993 | Lauffenburger | |
| 5,333,117 A | 7/1994 | Ha et al. | |
| 5,383,042 A | 1/1995 | Robinson | |
| 5,394,257 A | 2/1995 | Horan et al. | |
| 5,410,145 A | 4/1995 | Coroy | |
| 5,428,711 A | 6/1995 | Akiyama et al. | |
| 5,448,749 A | 9/1995 | Kyuma et al. | |
| 5,495,356 A | 2/1996 | Sharony et al. | |
| 5,576,873 A | 11/1996 | Crossland et al. | |
| 5,621,227 A | 4/1997 | Joshi | |
| 5,640,261 A | 6/1997 | Ono | |
| 5,699,449 A | 12/1997 | Javidi | |
| 5,784,309 A | 7/1998 | Budil | |
| 5,920,414 A * | 7/1999 | Miyachi | H04B 10/506 398/91 |
| 5,953,143 A | 9/1999 | Sharony et al. | |
| 6,005,998 A | 12/1999 | Lee | |
| 6,060,710 A | 5/2000 | Carrieri et al. | |
| 6,178,020 B1 | 1/2001 | Schultz et al. | |
| 6,445,470 B1 | 9/2002 | Jenkins et al. | |
| 6,525,858 B1 | 2/2003 | Nagahori | |
| 6,590,197 B2 | 7/2003 | Wadsworth et al. | |
| 6,728,434 B2 | 4/2004 | Flanders | |
| 7,050,116 B2 | 5/2006 | Van Zanten et al. | |
| 7,136,587 B1 | 11/2006 | Davis et al. | |
| 7,173,272 B2 | 2/2007 | Ralph | |
| 7,230,227 B2 | 6/2007 | Wilcken et al. | |
| 7,366,362 B2 * | 4/2008 | Tanimura | H04B 10/50572 359/239 |
| 7,515,753 B2 | 4/2009 | Goldenberg et al. | |
| 7,536,431 B2 | 5/2009 | Goren et al. | |
| 7,660,533 B1 | 2/2010 | Meyers et al. | |
| 7,876,248 B2 | 1/2011 | Berkley et al. | |
| 7,985,965 B2 | 7/2011 | Barker et al. | |
| 8,018,244 B2 | 9/2011 | Berkley | |
| 8,023,828 B2 | 9/2011 | Beausoleil et al. | |
| 8,026,837 B1 | 9/2011 | Valley et al. | |
| 8,027,587 B1 | 9/2011 | Watts | |
| 8,035,540 B2 | 10/2011 | Berkley et al. | |
| 8,129,670 B2 | 3/2012 | Laycock et al. | |
| 8,190,553 B2 | 5/2012 | Routt | |
| 8,223,414 B2 | 7/2012 | Goto | |
| 8,247,780 B2 | 8/2012 | Zhang et al. | |
| 8,324,670 B2 | 12/2012 | Bui et al. | |
| 8,386,899 B2 | 2/2013 | Goto et al. | |
| 8,478,138 B2 | 7/2013 | Sugawara et al. | |
| 8,560,282 B2 | 10/2013 | Macready et al. | |
| 8,576,677 B2 | 11/2013 | Kurokawa et al. | |
| 8,604,944 B2 | 12/2013 | Berkley et al. | |
| 8,620,855 B2 | 12/2013 | Bonderson | |
| 8,837,544 B2 | 9/2014 | Santori | |
| 9,009,560 B1 | 4/2015 | Matache et al. | |
| 9,250,391 B2 | 2/2016 | McLaughlin et al. | |
| 9,354,039 B2 | 5/2016 | Mower et al. | |
| 9,513,276 B2 | 12/2016 | Tearney et al. | |
| 9,791,258 B2 | 10/2017 | Mower | |
| 9,991,967 B1 | 6/2018 | Wang et al. | |
| 10,009,135 B2 | 6/2018 | Tait et al. | |
| 10,095,262 B2 | 10/2018 | Valley et al. | |
| 10,158,481 B2 * | 12/2018 | Bunandar | H04L 9/0852 |
| 10,197,971 B1 | 2/2019 | Horst | |
| 10,268,232 B2 | 4/2019 | Harris et al. | |
| 10,359,272 B2 | 7/2019 | Mower et al. | |
| 10,382,139 B2 | 8/2019 | Rosenhouse et al. | |
| 10,483,922 B2 | 11/2019 | Shibata et al. | |
| 10,670,860 B2 | 6/2020 | Tait et al. | |
| 10,763,974 B2 | 9/2020 | Bunandar et al. | |
| 11,093,215 B2 | 8/2021 | Harris et al. | |
| 2003/0025562 A1 | 2/2003 | Andreou et al. | |
| 2003/0086138 A1 | 5/2003 | Pittman et al. | |
| 2003/0235363 A1 | 12/2003 | Pfeiffer | |
| 2003/0235413 A1 | 12/2003 | Cohen et al. | |
| 2004/0243657 A1 | 12/2004 | Goren et al. | |
| 2005/0036786 A1 | 2/2005 | Ramachandran et al. | |
| 2006/0204169 A1 * | 9/2006 | Li | G02F 1/3137 359/341.1 |
| 2006/0215949 A1 | 9/2006 | Lipson et al. | |
| 2007/0180586 A1 | 8/2007 | Amin | |
| 2008/0002993 A1 | 1/2008 | Kirkpatrick et al. | |
| 2008/0031566 A1 | 2/2008 | Matsubara et al. | |
| 2008/0212186 A1 | 9/2008 | Zoller et al. | |
| 2008/0212980 A1 | 9/2008 | Weiner | |
| 2008/0273835 A1 | 11/2008 | Popovic | |
| 2009/0028554 A1 | 1/2009 | Anderson et al. | |
| 2009/0238579 A1 | 9/2009 | Rahn et al. | |
| 2010/0165432 A1 | 7/2010 | Laycock et al. | |
| 2010/0215365 A1 | 8/2010 | Fukuchi | |
| 2010/0284703 A1 | 11/2010 | Suzuki | |
| 2011/0248150 A1 | 10/2011 | Bureau et al. | |
| 2011/0299555 A1 | 12/2011 | Cronie et al. | |
| 2012/0163815 A1 | 6/2012 | Mori et al. | |
| 2012/0213531 A1 * | 8/2012 | Nazarathy | G02F 7/00 398/202 |
| 2013/0011093 A1 | 1/2013 | Goh et al. | |
| 2013/0121706 A1 | 5/2013 | Yang et al. | |
| 2014/0003761 A1 | 1/2014 | Dong | |
| 2014/0056585 A1 | 2/2014 | Qian et al. | |
| 2014/0241657 A1 | 8/2014 | Manouvrier | |
| 2014/0299743 A1 * | 10/2014 | Miller | G02F 1/0136 359/629 |
| 2015/0063823 A1 | 3/2015 | Eiselt | |
| 2015/0249505 A1 | 9/2015 | Provost et al. | |
| 2015/0354938 A1 * | 12/2015 | Mower | B82Y 20/00 356/450 |
| 2015/0382089 A1 | 12/2015 | Mazed | |
| 2016/0103281 A1 | 4/2016 | Matsumoto | |
| 2016/0112129 A1 | 4/2016 | Chang | |
| 2016/0118106 A1 | 4/2016 | Yoshimura et al. | |
| 2016/0162781 A1 | 6/2016 | Lillicrap et al. | |
| 2016/0162798 A1 | 6/2016 | Marandi et al. | |
| 2016/0182155 A1 | 6/2016 | Taylor et al. | |
| 2016/0245639 A1 | 8/2016 | Mower et al. | |
| 2016/0261346 A1 | 9/2016 | Li et al. | |
| 2016/0301478 A1 * | 10/2016 | Luo | G02F 1/225 |
| 2016/0352515 A1 | 12/2016 | Bunandar et al. | |
| 2017/0031101 A1 | 2/2017 | Miller | |
| 2017/0201813 A1 | 7/2017 | Sahni | |
| 2017/0237505 A1 | 8/2017 | Lucamarini et al. | |
| 2017/0285373 A1 | 10/2017 | Zhang et al. | |
| 2017/0302396 A1 | 10/2017 | Tait et al. | |
| 2017/0346592 A1 | 11/2017 | Liu et al. | |
| 2017/0351293 A1 | 12/2017 | Carolan et al. | |
| 2018/0019818 A1 * | 1/2018 | Yu | H04B 10/5165 |
| 2018/0094971 A1 | 4/2018 | Rutter et al. | |
| 2018/0107237 A1 | 4/2018 | Andregg et al. | |
| 2018/0124348 A1 | 5/2018 | Verdant et al. | |
| 2018/0211158 A1 * | 7/2018 | Shainline | G06N 3/088 |
| 2018/0274906 A1 | 9/2018 | Mower et al. | |
| 2018/0323825 A1 | 11/2018 | Cioffi et al. | |
| 2018/0335574 A1 | 11/2018 | Steinbrecher et al. | |
| 2019/0110084 A1 | 4/2019 | Jia et al. | |
| 2019/0173503 A1 * | 6/2019 | Kolodziej | H04B 10/40 |
| 2019/0289237 A1 | 9/2019 | Verbugt et al. | |
| 2019/0331912 A1 | 10/2019 | Tait et al. | |

(56) References Cited

U.S. PATENT DOCUMENTS

| | | | | |
|---|---|---|---|---|
| 2019/0346685 | A1* | 11/2019 | Miller | G02F 1/31 |
| 2019/0354894 | A1 | 11/2019 | Lazovich et al. | |
| 2019/0356394 | A1 | 11/2019 | Bunandar et al. | |
| 2019/0370644 | A1 | 12/2019 | Kenney et al. | |
| 2019/0372589 | A1 | 12/2019 | Gould et al. | |
| 2020/0083659 | A1* | 3/2020 | Reeves-Hall | H01S 3/1301 |
| 2020/0228077 | A1 | 7/2020 | Harris et al. | |
| 2020/0272794 | A1 | 8/2020 | Kenney et al. | |
| 2020/0396007 | A1 | 12/2020 | Bunandar et al. | |
| 2021/0036783 | A1* | 2/2021 | Bunandar | H04B 10/801 |
| 2021/0157547 | A1 | 5/2021 | Bunandar et al. | |
| 2021/0157878 | A1 | 5/2021 | Bunandar et al. | |
| 2021/0201126 | A1* | 7/2021 | Meng | G02F 3/00 |
| 2021/0365240 | A1 | 11/2021 | Harris et al. | |
| 2022/0263582 | A1* | 8/2022 | Ma | H04J 14/0278 |

FOREIGN PATENT DOCUMENTS

| | | | | |
|---|---|---|---|---|
| CN | 101630178 | A | | 1/2010 |
| CN | 101877614 | A * | | 11/2010 |
| CN | 113496281 | A * | 10/2021 | G06E 1/045 |
| EP | 0251062 | A2 | | 1/1988 |
| EP | 2860887 | B1 * | 8/2018 | H04B 10/2575 |
| WO | WO 2005/029404 | A2 | | 3/2005 |
| WO | WO 2006/023067 | A2 | | 3/2006 |
| WO | WO 2008/069490 | A1 | | 6/2008 |
| WO | WO 2011/116196 | A1 | | 9/2011 |
| WO | WO 2011/116198 | A1 | | 9/2011 |
| WO | WO 2018/098230 | A1 | | 5/2018 |
| WO | Wo 2019/115517 | A1 | | 6/2019 |
| WO | WO 2019/217835 | A1 | | 11/2019 |
| WO | WO-2020191217 | A1 * | 9/2020 | G02F 1/225 |

OTHER PUBLICATIONS

Invitation to Pay Additional Fees for International Application No. PCT/US19/32181 dated Jul. 23, 2019.

International Search Report and Written Opinion for International Application No. PCT/US19/32181 dated Sep. 23, 2019.

International Preliminary Report on Patentability dated Nov. 26, 2020 in connection with International Application No. PCT/US2019/032181.

International Search Report and Written Opinion for International Application No. PCT/US2019/032272 dated Sep. 4, 2019.

Invitation to Pay Additional Fees for International Application No. PCT/US2020/043841 dated Oct. 13, 2020.

International Search Report and Written Opinion dated Dec. 18, 2020 in connection with International Application No. PCT/US2020/043841.

International Search Report and Written Opinion dated Mar. 24, 2021 in connection with International Application No. PCT/US2020/061642.

Invitation to Pay Additional Fees for International Application No. PCT/US2020/061642, dated Jan. 27, 2021.

[No Author Listed], Optical Coherent Receiver Analysis. 2009 Optiwave Systems, Inc. 16 pages. URL:https://dru5cjyjifvrg.cloudfront.net/wp-content/uploads/2017/03/OptiSystem-Applications-Coherent-Receiver-Analysis.pdf [retrieved on Aug. 17, 2019].

Aaronson et al., Computational complexity of linear optics. Proceedings of the 43rd Annual Acm Symposium on Theory of Computing. 2011. 101 pp.. ISBN 978-1-4503-0691-1.

Abu-Mostafa et al., Optical neural computers. Scientific American. 1987:88-95.

Albert et al., Statistical mechanics of com-plex networks. Reviews of Modern Physics. 2002;(74):47-97.

Almeida et al., All-optical control of light on a silicon chip. Nature. 2004;431:1081-1084.

Amir et al., Classical diffusion of a quantum particle in a noisy environment. Physical Review E. 2009;79. 5 pages. DOI: 10.1103/PhysRevE.79.050105.

Amit et al., Spin-glass models of neural networks. Physical Review A. 1985;32(2):1007-1018.

Anitha et al., Comparative Study of High performance Braun's multiplier using FPGAs. IOSR Journal of Electronics and Communication Engineering (IOSRJECE). 2012;1:33-37.

Appeltant et al., Information processing using a single dynamical node as complex system. Nature Communications. 2011. 6 pages. DOI: 10.1038/ncomms1476.

Arjovsky et al., Unitary Evolution Recurrent Neural Networks. arXiv:1511.06464. 2016. 9 pages.

Aspuru-Guzik et al., Photonic quantum simulators. Nature Physics. 2012;8:285-291. DOI: 10.1038/NPHYS2253.

Aspuru-Guzik et al., Simulated Quantum Computation of Molecular Energies. Science. 2005;309:1704-7.

Atabaki et al., Integrating photonics with silicon nanoelectronics for the next generation of systems on a chip. Nature. 2018;556(7701):349-354. 10 pages. DOI: 10.1038/s41586-018-0028-z.

Baehr-Jones et al., a 25 Gb/s Silicon Photonics Platform. arXiv:1203.0767. 2012. 11 pages.

Bao et al., Atomic-Layer Graphene as a Saturable Absorber for Ultrafast Pulsed Lasers. 24 pages. 2009.

Bao et al., Monolayer graphene as a saturable absorber in a mode-locked laser. Nano Research. 2011;4:297-307. DOI: 10.1007/s12274-010-0082-9.

Barahona, on the computational complexity of Ising spin glass models. Journal of Physics A: Mathematical and General. 1982;15:3241-3253.

Bertsimas et al., Robust optimization with simulated annealing. Journal of Global Optimization. 2010;48:323-334. DOI 10.1007/s10898-009-9496-x.

Bewick, Fast multiplication: algorithms and implementation. Ph.D. thesis, Stanford University (1994). 170 pages.

Bonneau et al., Quantum interference and manipulation of entanglement in silicon wire waveguide quantum circuits. New Journal of Physics. 2012;14:045003. 13 pages. DOI: 10.1088/1367-2630/14/4/045003.

Brilliantov, Effective magnetic Hamiltonian and Ginzburg criterion for fluids. Physical Review E. 1998;58:2628-2631.

Bromberg et al., Bloch oscillations of path-entangled photons. Physical Review Letters. 2010;105:263604-1-2633604-4. 4 pages. DOI: 10.1103/PhysRevLett.105.263604.

Bromberg et al., Quantum and Classical Correlations in Waveguide Lattices. Physical Review Letters. 2009;102:253904-1-253904-4. 4 pages. DOI: 10.1103/PhysRevLett.102.253904.

Broome et al., Photonic Boson Sampling in a Tunable Circuit. Science. 2012;339:794-8.

Bruck et al., On the power of neural networks for solving hard problems. American Institute of Physics. 1988. pp. 137-143. 7 pages.

Canziani et al., Evaluation of neural network architectures for embedded systems. Circuits and Systems (ISCAS). 2017 IEEE International Symposium. 4 pages.

Cardenas et al., Low loss etchless silicon photonic waveguides. Optics Express. 2009;17(6):4752-4757.

Carolan et al., Universal linear optics. Science. 2015;349:711-716.

Caves, Quantum-mechanical noise in an interferometer. Physical Review D. 1981;23(8):1693-1708. 16 pages.

Centeno et al., Optical bistability in finite-size nonlinear bidimensional photonic crystals doped by a microcavity. Physical Review B. 2000;62(12):R7683-R7686.

Chan, Optical flow switching networks. Proceedings of the IEEE. 2012;100(5):1079-1091.

Chen et al., Compact, low-loss and low-power 8×8 broadband silicon optical switch. Optics Express. 2012;20(17):18977-18985.

Chen et al., DianNao: A small-footprint high-throughput accelerator for ubiquitous machine-learning. ACM Sigplan Notices. 2014;49:269-283.

Chen et al., Efficient photon pair sources based on silicon-on-insulator microresonators. Proc. of SPIE. 2010;7815. 10 pages.

Chen et al., Frequency-bin entangled comb of photon pairs from a Silicon-on-Insulator micro-resonator. Optics Express. 2011;19(2):1470-1483.

(56) References Cited

OTHER PUBLICATIONS

Chen et al., Universal method for constructing N-port nonblocking optical router based on 2×2 optical switch for photonic networks-on-chip. Optics Express. 2014;22(10);12614-12627. DOI: 10.1364/OE.22.012614.

Cheng et al., In-Plane Optical Absorption and Free Carrier Absorption in Graphene-on-Silicon Waveguides. IEEE Journal of Selected Topics in Quantum Electronics. 2014;20(1). 6 pages.

Chetlur et al., cuDNN: Efficient primitives for deep learning. arXiv preprint arXiv:1410.0759. 2014. 9 pages.

Childs et al., Spatial search by quantum walk. Physical Review A. 2004;70(2):022314. 11 pages.

Chung et al., A monolithically integrated large-scale optical phased array in silicon-on-insulator cmos. IEEE Journal of Solid-State Circuits. 2018;53:275-296.

Cincotti, Prospects on planar quantum computing. Journal of Lightwave Technology. 2009;27(24):5755-5766.

Clements et al., Optimal design for universal multiport interferometers. Optica. 2016;3(12):1460-1465.

Crespi et al., Integrated multimode interferometers with arbitrary designs for photonic boson sampling. Nature Photonics. 2013;7:545-549. DOI: 10.1038/NPHOTON.2013.112.

Crespi, et al., Anderson localization of entangled photons in an integrated quantum walk. Nature Photonics. 2013;7:322-328. DOI: 10.1038/NPHOTON.2013.26.

Dai et al., Novel concept for ultracompact polarization splitter-rotator based on silicon nanowires. Optics Express. 2011;19(11):10940-9.

Di Giuseppe et al., Einstein-Podolsky-Rosen Spatial Entanglement in Ordered and Anderson Photonic Lattices. Physical Review Letters. 2013;110:150503-1-150503-5. DOI: 10.1103/PhysRevLett.110.150503.

Dunningham et al., Efficient comparison of path-lengths using Fourier multiport devices. Journal of Physics B: Atomic, Molecular and Optical Physics. 2006;39:1579-1586. DOI:10.1088/0953-4075/39/7/002.

Esser et al., Convolutional networks for fast, energy-efficient neuromorphic computing. Proceedings of the National Academy of Sciences. 2016;113(41):11441-11446.

Farhat et al., Optical implementation of the Hopfield model. Applied Optics. 1985;24(10):1469-1475.

Feinberg et al., Making memristive neural network accelerators reliable. IEEE International Symposium on High Performance Computer Architecture (HPCA). 2018. pp. 52-65. DOI 10.1109/HPCA.2018.00015.

Fushman et al., Controlled Phase Shifts with a Single Quantum Dot. Science. 2008;320:769-772. DOI: 10.1126/science.1154643.

George et al., a programmable and configurable mixed-mode FPAA SoC. IEEE Transactions on Very Large Scale Integration (VLSI) Systems. 2016;24:2253-2261.

Gilmer et al., Neural message passing for quantum chemistry. arXiv preprint arXiv:1704.01212. Jun. 2017. 14 pages.

Golub et al., Calculating the singular values and pseudo-inverse of a matrix. Journal of the Society for Industrial and Applied Mathematics Series B Numerical Analysis. 1965;2(2):205-224.

Graves et al., Hybrid computing using a neural network with dynamic external memory. Nature. 2016;538. 21 pages. DOI:10.1038/nature20101.

Grote et al., First long-term application of squeezed states of light in a gravitational-wave observatory. Physical Review Letter. 2013;110:181101. 5 pages. DOI: 10.1103/PhysRevLett.110.181101.

Gruber et al., Planar-integrated optical vector-matrix multiplier. Applied Optics. 2000;39(29):5367-5373.

Gullans et al., Single-Photon Letter. 2013;111:247401-1-247401-5. Nonlinear Optics with Graphene Plasmons. Physical Review DOI: 10.1103/PhysRevLett.111.247401.

Gunn, CMOS photonics for high-speed interconnects. IEEE Micro. 2006;26:58-66.

Haffner et al., Low-loss plasmon-assisted electro-optic modulator. Nature. 2018;556:483-486. 17 pages. DOI: 10.1038/s41586-018-0031-4.

Halasz et al., Phase diagram of QCD. Physical Review D. 1998;58:096007. 11 pages.

Hamerly et al., Scaling advantages of all-to-all connectivity in physical annealers: the Coherent Ising Machine vs. D-Wave 2000Q. arXiv preprints, May 2018. 17 pages.

Harris et al. Efficient, Compact and Low Loss Thermo-Optic Phase Shifter in Silicon. Optics Express. 2014;22(9);10487-93. DOI:10.1364/OE.22.010487.

Harris et al., Bosonic transport simulations in a large-scale programmable nanophotonic processor. arXiv:1507.03406. 2015. 8 pages.

Harris et al., Integrated source of spectrally filtered correlated photons for large-scale quantum photonic systems. Physical Review X. 2014;4:041047. 10 pages. DOI: 10.1103/PhysRevX.4.041047.

Harris et al., Quantum transport simulations in a programmable nanophotonic processor. Nature Photonics. 2017;11:447-452. DOI: 10.1038/NPHOTON.2017.95.

Hinton et al., Reducing the dimensionality of data with neural networks. Science. 2006;313:504-507.

Hochberg et al., Silicon Photonics: The Next Fabless Semiconductor Industry. IEEE Solid-State Circuits Magazine. 2013. pp. 48-58. DOI: 10.1109/MSSC.2012.2232791.

Honerkamp-Smith et al., An introduction to critical points for biophysicists; observations of compositional heterogeneity in lipid membranes. Biochimica et Biophysica Acta (BBA). 2009;1788:53-63. DOI: 10.1016/j.bbamem.2008.09.010.

Hong et al., Measurement of subpicosecond time intervals between two photons by interference. Physical Review Letters. 1987;59(18):2044-2046.

Hopfield et al., Neural computation of decisions in optimization problems. Biological Cybernetics. 1985;52;141-152.

Hopfield, Neural networks and physical systems with emergent collective computational abilities. PNAS. 1982;79:2554-2558. DOI: 10.1073/pnas.79.8.2554.

Horowitz, Computing's energy problem (and what we can do about it). Solid-State Circuits Conference Digest of Technical Papers (ISSCC), 2014 IEEE International. 5 pages.

Horst et al., Cascaded Mach-Zehnder wavelength filters in silicon photonics for low loss and flat pass-band WDM (de-)multiplexing. Optics Express. 2013;21(10):11652-8. DOI:10.1364/OE.21.011652.

Humphreys et al., Linear Optical Quantum Computing in a Single Spatial Mode. Physical Review Letters. 2013;111:150501. 5 pages. DOI: 10.1103/PhysRevLett.111.150501.

Inagaki et al., Large-scale ising spin network based on degenerate optical parametric oscillators. Nature Photonics. 2016;10:415-419. 6 pages. DOI: 10.1038/NPHOTON.2016.68.

Isichenko, Percolation, statistical topography, and trans-port in random media. Reviews of Modern Physics. 1992;64(4):961-1043.

Jaekel et al., Quantum limits in interferometric measurements. Europhysics Letters. 1990;13(4):301-306.

Jalali et al., Silicon Photonics. Journal of Lightwave Technology. 2006;24(12):4600-15. DOI: 10.1109/JLT.2006.885782.

Jia et al., Caffe: Convolutional architecture for fast feature embedding. Proceedings of the 22nd ACM International Conference on Multimedia. Nov. 2014. 4 pages. URL:http://doi.acm.org/10.1145/2647868.2654889.

Jiang et al., A planar ion trapping microdevice with integrated waveguides for optical detection. Optics Express. 2011;19(4):3037-43.

Jonsson, An empirical approach to finding energy efficient ADC architectures. 2011 International Workshop on ADC Modelling, Testing and Data Converter Analysis and Design and IEEE 2011 ADC Forum. 6 pages.

Jouppi et al., In-datacenter performance analysis of a tensor processing unit. Proceeding of Computer Architecture (ISCA). Jun. 2017. 12 pages. URL:https://doi.org/10.1145/3079856.3080246.

Kahn et al., Communications expands its space. Nature Photonics. 2017;11:5-8.

(56) References Cited

OTHER PUBLICATIONS

Kardar et al., Dynamic Scaling of Growing Interfaces. Physical Review Letters. 1986;56(9):889-892.
Karpathy, CS231n Convolutional Neural Networks for Visual Recognition. Class notes. 2019. URL:http://cs231n.github.io/ 2 pages. [last accessed Sep. 24, 2019].
Kartalopoulos, Part III Coding Optical Information. Introduction to DWDM Technology. IEEE Press. 2000. pp. 165-166.
Keckler et al., GPUs and the future of parallel computing. IEEE Micro. 2011;31:7-17. DOI: 10.1109/MM.2011.89.
Kieling et al., On photonic Controlled Phase Gates. New Journal of Physics. 2010;12:0133003. 17 pages. DOI: 10.1088/1367-2630/12/1/013003.
Kilper et al., Optical networks come of age. Optics Photonics News. 2014;25:50-57. DOI: 10.1364/OPN.25.9.000050.
Kim et al., A functional hybrid memristor crossbar-array/cmos system for data storage and neuromorphic applications. Nano Letters. 2011;12:389-395.
Kirkpatrick et al., Optimization by simulated annealing. Science. 1983;220(4598):671-680.
Knill et al., A scheme for efficient quantum computation with linear optics. Nature. 2001;409(4652):46-52.
Knill et al., the Bayesian brain: the role of uncertainty in neural coding and computation. Trends in Neurosciences. 2004;27(12):712-719.
Knill, Quantum computing with realistically noisy devices. Nature. 2005;434:39-44.
Kok et al., Linear optical quantum computing with photonic qubits. Reviews of Modern Physics. 2007;79(1):135-174.
Koos et al., Silicon-organic hybrid (SOH) and plasmonic-organic hybrid (POH) integration. Journal of Lightwave Technology. 2016;34(2):256-268.
Krizhevsky et al., ImageNet classification with deep convolutional neural networks. Advances in Neural Information Processing Systems (NIPS). 2012. 9 pages.
Kucherenko et al., Application of Deterministic Low-Discrepancy Sequences in Global Optimization. Computational Optimization and Applications. 2005;30:297-318.
Kwack et al., Monolithic InP strictly non-blocking 8×8 switch for high-speed Wdm optical interconnection. Optics Express. 2012;20(27):28734-41.
Lahini et al., Anderson Localization and Nonlinearity in One-Dimensional Disordered Photonic Lattices. Physical Review Letters. 2008;100:013906. 4 pages. DOI: 10.1103/PhysRevLett.100.013906.
Lahini et al., Quantum Correlations in Two-Particle Anderson Localization. Physical Review Letters. 2010;105:163905. 4 pages. DOI: 10.1103/PhysRevLett.105.163905.
Laing et al., High-fidelity operation of quantum photonic circuits. Applied Physics Letters. 2010;97:211109. 5 pages. DOI: 10.1063/1.3497087.
Landauer, Irreversibility and heat generation in the computing process. IBM Journal of Research and Development. 1961. pp. 183-191.
Lanyon et al., Towards quantum chemistry on a quantum computer. Nature Chemistry. 2010;2:106-10. DOI: 10.1038/NCHEM.483.
Lawson et al., Basic linear algebra subprograms for Fortran usage. ACM Transactions on Mathematical Software (TOMS). 1979;5(3):308-323.
Lecun et al., Deep learning. Nature. 2015;521:436-444. DOI:10.1038/nature14539.
Lecun et al., Gradient-based learning applied to document recognition. Proceedings of the IEEE. Nov. 1998. 46 pages.
Levi et al., Hyper-transport of light and stochastic acceleration by evolving disorder. Nature Physics. 2012;8:912-7. DOI: 10.1038/NPHYS2463.
Li et al., Efficient and self-adaptive in-situ learning in multilayer memristor neural networks. Nature Communications. 2018;9:2385. 8 pages. doi: 10.1038/s41467-018-04484-2.
Lin et al., All-optical machine learning using diffractive deep neural networks. Science. 2018;361:1004-1008. 6 pages. doi: 10.1126/science.aat8084.
Little, The existence of persistent states in the brain. Mathematical Biosciences. 1974;19:101-120.
Liu et al., Towards 1-Tb/s Per-Channel Optical Transmission Based on Multi-Carrier Modulation. 19th Annual Wireless and Optical Communications Conference. May 2010. 4 pages. DOI: 10.1109/WOCC.2010.5510630.
Lu et al., 16×16 non-blocking silicon optical switch based on electro-optic Mach-Zehnder interferometers. Optics Express. 2016:24(9):9295-9307. doi: 10.1364/OE.24.009295.
Ma et al., Optical switching technology comparison: Optical mems vs. Other technologies. IEEE Optical Communications. 2003;41(11):S16-S23.
Macready et al., Criticality and Parallelism in Combinatorial Optimization. Science. 1996;271:56-59.
Marandi et al., Network of time-multiplexed optical parametric oscillators as a coherent Ising machine. Nature Photonics. 2014;8:937-942. doi: 10.1038/NPHOTON.2014.249.
Martin-Lopez et al., Experimental realization of Shor's quantum factoring algorithm using qubit recycling. Nature Photonics. 2012;6:773-6. DOI: 10.1038/NPHOTON.2012.259.
Mcmahon et al., A fully programmable 100-spin coherent Ising machine with all-to-all connections. Science. 2016;354(6312):614-7. DOI: 10.1126/science.aah5178.
Mead, Neuromorphic electronic systems. Proceedings of the IEEE. 1990;78(10):1629-1636.
Migdall et al., Tailoring single-photon and multiphoton probabilities of a single-photon on-demand source. Physical Review A. 2002;66:053805. 4 pages. DOI: 10.1103/PhysRevA.66.053805.
Mikkelsen et al., Dimensional variation tolerant silicon-on-insulator directional couplers. Optics Express. 2014;22(3):3145-50. DOI:10.1364/OE.22.003145.
Miller, Are optical transistors the logical next step? Nature Photonics. 2010;423-5.
Miller, Attojoule optoelectronics for low-energy information processing and communications. Journal of Lightwave Technology. 2017;35(3):346-96. DOI: 10.1109/JLT.2017.2647779.
Miller, Energy consumption in optical modulators for interconnects. Optics Express. 2012;20(S2):A293-A308.
Miller, Perfect optics with imperfect components. Optica. 2015;2(8):747-750.
Miller, Reconfigurable add-drop multiplexer for spatial modes. Optics Express. 2013;21(17):20220-9. DOI:10.1364/OE.21.020220.
Miller, Self-aligning universal beam coupler, Optics Express. 2013;21(5):6360-70.
Miller, Self-configuring universal linear optical component [Invited]. Photonics Research. 2013;1(1):1-15. URL:http://dx.doi.org/10.1364/PRJ.1.000001.
Misra et al., Artificial neural networks in hardware: A survey of two decades of progress. Neurocomputing. 2010;74:239-255.
Mohseni et al., Environment-assisted quantum walks in photosynthetic complexes. The Journal of Chemical Physics. 2008;129:174106. 10 pages. DOI: 10.1063/1.3002335.
Molesky et al., Inverse design in nanophotonics. Nature Photonics. Nov. 2018;12(11):659-70. https://doi.org/10.1038/s41566-018-0246-9.
Moore, Cramming more components onto integrated circuits. Proceeding of the IEEE. 1998;86(1):82-5.
Mower et al., Efficient generation of single and entangled photons on a silicon photonic integrated chip. Physical Review A. 2011;84:052326. 7 pages. DOI: 10.1103/PhysRevA.84.052326.
Mower et al., High-fidelity quantum state evolution in imperfect photonic integrated circuits. Physical Review A. 2015;92(3):032322. 7 pages. doi: 10.1103/PhysRevA.92.032322.
Nagamatsu et al., A 15 NS 32×32-bit CMOS multiplier with an improved parallel structure. IEEE Custom Integrated Circuits Conference. 1989. 4 pages.
Najafi et al., On-Chip Detection of Entangled Photons by Scalable Integration of Single-Photon Detectors. arXiv:1405.4244. May 16, 2014. 27 pages.

(56) References Cited

OTHER PUBLICATIONS

Najafi et al., On-Chip detection of non-classical light by scalable integration of single-photon detectors. Nature Communications. 2015;6:5873. 8 pages. DOI: 10.1038/ncomms6873.

Naruse, Nanophotonic Information Physics. Nanointelligence and Nanophotonic Computing. Springer. 2014. 261 pages. DOI 10.1007/978-3-642-40224-1.

Nozaki et al., Sub-femtojoule all-optical switching using a photonic-crystal nanocavity. Nature Photonics. 2010;4:477-483. doi: 10.1038/NPHOTON.2010.89.

O'Brien et al., Demonstration of an all-optical quantum controlled-NOT gate. Nature. 2003;426:264-7.

Onsager, Crystal Statistics. I. A Two-Dimensional Model with an Order-Disorder Transition. Physical Review. 1944;65(3,4):117-149.

Orcutt et al., Nanophotonic integration in state-of-the-art CMOS foundries. Optics Express. 2011;19(3):2335-46.

Pelissetto et al., Critical phenomena and renormalization-group theory. Physics Reports. Apr. 2002. 150 pages.

Peng, Implementation of AlexNet with Tensorflow. https://github.com/ykpengba/AlexNet-A-Practical-Implementation. 2018. 2 pages. [last accessed Sep. 24, 2019].

Peretto, Collective properties of neural networks: A statistical physics approach. Biological Cybernetics. 1984;50:51-62.

Pernice et al., High-speed and high-efficiency travelling wave single-photon detectors embedded in nanophotonic circuits. Nature Communications 2012;3:1325. 10 pages. DOI: 10.1038/ncomms2307.

Peruzzo et al., Quantum walk of correlated photons. Science. 2010;329;1500-3. DOI: 10.1126/science.1193515.

Politi et al., Integrated Quantum Photonics, IEEE Journal of Selected Topics in Quantum Electronics, 2009;5(6):1-12. DOI: 10.1109/JSTQE.2009.2026060.

Politi et al., Silica-on-Silicon Waveguide Quantum Circuits. Science. 2008;320:646-9. DOI: 10.1126/science.1155441.

Poon et al., Neuromorphic silicon neurons and large-scale neural networks: challenges and opportunities. Frontiers in Neuroscience. 2011;5:1-3. doi: 10.3389/fnins.2011.00108.

Prucnal et al., Recent progress in semiconductor excitable lasers for photonic spike processing. Advances in Optics and Photonics. 2016;8(2):228-299.

Psaltis et al., Holography in artificial neural networks. Nature. 1990;343:325-330.

Qiao et al., 16×16 non-blocking silicon electro-optic switch based on mach zehnder interferometers. Optical Fiber Communication Conference. Optical Society of America. 2016. 3 pages.

Ralph et al., Linear optical controlled-NOT gate in the coincidence basis. Physical Review A. 2002;65:062324-1-062324-5. DOI: 10.1103/PhysRevA.65.062324.

Ramanitra et al., Scalable and multi-service passive optical access infrastructure using variable optical splitters. Optical Fiber Communication Conference. Optical Society of America. 2005. 3 pages.

Raussendorf et al., A one-way quantum computer. Physical Review Letter. 2001;86(22):5188-91. DOI: 10.1103/PhysRevLett.86.5188.

Rechtsman et al., Photonic floquet topological insulators. Nature. 2013;496:196-200. doi: 10.1038/nature12066.

Reck et al., Experimental realization of any discrete unitary operator. Physical review letters. 1994;73(1):58-61. 6 pages.

Reed et al., Silicon optical modulators. Nature Photonics. 2010;4:518-26. DOI: 10.1038/NPHOTON.2010.179.

Rendl et al., Solving Max-Cut to optimality by intersecting semidefinite and polyhedral relaxations. Mathematical Programming. 2010;121:307-335. doi: 10.1007/s10107-008-0235-8.

Rios et al., Integrated all-photonic non-volatile multilevel memory. Nature Photonics. 2015;9:725-732. doi: 10.1038/NPHOTON.2015.182.

Rogalski, Progress in focal plane array technologies. Progress in Quantum Electronics. 2012;36:342-473.

Rohit et al., 8×8 space and wavelength selective cross-connect for simultaneous dynamic multi-wavelength routing. Optical Fiber Communication Conference. OFC/NFOEC Technical Digest. 2013. 3 pages.

Rosenblatt, The perceptron: a probabilistic model for information storage and organization in the brain. Psychological Review. 1958;65(6):386-408.

Russakovsky et al., ImageNet Large Scale Visual Recognition Challenge. arXiv:1409.0575v3. Jan. 2015. 43 pages.

Saade et al., Random projections through multiple optical scattering: Approximating Kernels at the speed of light. arXiv:1510.06664v2. Oct. 25, 2015. 6 pages.

Sacher et al., Polarization rotator-splitters in standard active silicon photonics platforms. Optics express. Feb. 24, 2014;22(4):3777-86.

Salandrino et al., Analysis of a three-core adiabatic directional coupler. Optics Communications. 2009;282:4524-6. doi:10.1016/j.optcom.2009.08.025.

Schaeff et al., Scalable fiber integrated source for higher-dimensional path-entangled photonic quNits. Optics Express. 2012;20(15):16145-153.

Schirmer et al., Nonlinear mirror based on two-photon absorption. Journal of the Optical Society of America B. 1997;14(11):2865-8.

Schmidhuber, Deep learning in neural networks: An overview. Neural Networks. 2015;61:85-117.

Schreiber et al., Decoherence and Disorder in Quantum Walks: From Ballistic Spread to Localization. Physical Review Letters. 2011;106:180403. 4 pages. DOI: 10.1103/PhysRevLett.106.180403.

Schwartz et al., Transport and Anderson localization in disordered two-dimensional photonic lattices. Nature. 2007;446:52-5. doi:10.1038/nature05623.

Selden, Pulse transmission through a saturable absorber. British Journal of Applied Physics. 1967;18:743-8.

Shafiee et al., ISAAC: A convolutional neural network accelerator with in-situ analog arithmetic in crossbars. ACM/IEEE 43rd Annual International Symposium on Computer Architecture. Oct. 2016. 13 pages.

Shen et al., Deep learning with coherent nanophotonic circuits. Nature Photonics. 2017;11:441-6. DOI: 10.1038/NPHOTON.2017.93.

Shoji et al., Low-crosstalk 2×2 thermo-optic switch with silicon wire waveguides. Optics Express.2010;18(9):9071-5.

Silver et al. Mastering chess and shogi by self-play with a general reinforcement learning algorithm. arXiv preprint arXiv:1712.01815. 19 pages. 2017.

Silver et al., Mastering the game of go with deep neural networks and tree search. Nature. 2016;529:484-9. 20 pages. doi:10.1038/nature16961.

Silver et al., Mastering the game of Go without human knowledge. Nature. 2017;550:354-9. 18 pages. doi:10.1038/nature24270.

Silverstone et al., On-chip quantum interference between silicon photon-pair sources. Nature Photonics. 2014;8:104-8. DOI: 10.1038/NPHOTON.2013.339.

Smith et al., Phase-controlled integrated photonic quantum circuits. Optics Express. 2009;17(16):13516-25.

Soljacic et al., Optimal bistable switching in nonlinear photonic crystals. Physical Review E. 2002;66:055601. 4 pages.

Solli et al., Analog optical computing. Nature Photonics. 2015;9:704-6.

Spring et al., Boson sampling on a photonic chip. Science. 2013;339:798-801. DOI: 10.1126/science.1231692.

Srinivasan et al., 56 Gb/s germanium waveguide electro-absorption modulator. Journal of Lightwave Technology. 2016;34(2):419-24. DOI: 10.1109/JLT.2015.2478601.

Steinkraus et al., Using GPUs for machine learning algorithms. Proceedings of the 2005 Eight International Conference on Document Analysis and Recognition. 2005. 6 pages.

Suda et al., Quantum interference of photons in simple networks. Quantum Information Process. 2013;12:1915-45. DOI 10.1007/s11128-012-0479-3.

Sun et al., Large-scale nanophotonic phased array. Nature. 2013;493:195-9. doi:10.1038/nature11727.

(56) References Cited

OTHER PUBLICATIONS

Sun et al., Single-chip microprocessor that communicates directly using light. Nature. 2015;528:534-8. doi:10.1038/nature16454.
Suzuki et al., Ultra-compact 8×8 strictly-non-blocking Si-wire PILOSS switch. Optics Express. 2014;22(4):3887-94. DOI:10.1364/OE.22.003887.
Sze et al., Efficient processing of deep neural networks: A tutorial and survey. Proceedings of the IEEE. 2017;105(12):2295-2329. DOI: 10.1109/JPROC.2017.276174.
Tabia, Experimental scheme for qubit and qutrit symmetric informationally complete positive operator-valued measurements using multiport devices. Physical Review A. 2012;86:062107. 8 pages. DOI: 10.1103/PhysRevA.86.062107.
Tait et al., Broadcast and weight: An integrated network for scalable photonic spike processing. Journal of Lightwave Technology. 2014;32(21):3427-39. DOI: 10.1109/JLT.2014.2345652.
Tait et al., Chapter 8 Photonic Neuromorphic Signal Processing and Computing. Springer, Berlin, Heidelberg. 2014. pp. 183-222.
Tait et al., Neuromorphic photonic networks using silicon photonic weight banks. Scientific Reports. 2017;7:7430. 10 pages.
Tanabe et al., Fast bistable all-optical switch and memory on a silicon photonic crystal on-chip. Optics Letters. 2005;30(19):2575-7.
Tanizawa et al., Ultra-compact 32×32 strictly-non-blocking Si-wire optical switch with fan-out LGA interposer. Optics Express. 2015;23(13):17599-606. DOI:10.1364/OE.23.017599.
Thompson et al., Integrated waveguide circuits for optical quantum computing. IET Circuits, Devices, & Systems. 2011;5(2):94-102. doi: 10.1049/iet-cds.2010.0108.
Timurdogan et al., An ultralow power athermal silicon modulator. Nature Communications. 2014;5:4008. 11 pages. DOI: 10.1038/ncomms5008.
Vandoorne et al., Experimental demonstration of reservoir computing on a silicon photonics chip. Nature Communications. 2014;5:3541. 6 pages. DOI: 10.1038/ncomms4541.
Vazquez et al., Optical NP problem solver on laser-written waveguide plat-form. Optics Express. 2018;26(2):702-10.
Vivien et al., Zero-bias 40gbit/s germanium waveguide photodetector on silicon. Optics Express. 2012;20(2):1096-1101.
Wang et al., Coherent Ising machine based on degenerate optical parametric oscillators. Physical Review A. 2013;88:063853. 9 pages. DOI: 10.1103/PhysRevA.88.063853.
Wang et al., Deep learning for identifying metastatic breast cancer. arXiv preprint arXiv:1606.05718. Jun. 18, 2016. 6 pages.
Werbos, Beyond regression: New tools for prediction and analysis in the behavioral sciences. Ph.D. dissertation, Harvard University. Aug. 1974. 454 pages.
Whitfield et al., Simulation of electronic structure Hamiltonians using quantum computers. Molecular Physics. 2010;109(5,10):735-50. DOI: 10.1080/00268976.2011.552441.
Wu et al., an optical fiber network oracle for NP-complete problems. Light: Science & Applications. 2014;3: e147. 5 pages. doi:10.1038/lsa.2014.28.
Xia et al., Mode conversion losses in silicon-on-insulator photonic wire based racetrack resonators. Optics Express. 2006;14(9):3872-86.
Xu et al., Experimental observations of bistability and instability in a two-dimensional nonlinear optical superlattice. Physical Review Letters. 1993;71(24):3959-62.
Yang et al., Non-Blocking 4×4 Electro-Optic Silicon Switch for On-Chip Photonic Networks. Optics Express 2011;19(1):47-54.
Yao et al., Serial-parallel multipliers. Proceedings of 27th Asilomar Conference on Signals, Systems and Computers. 1993. pp. 359-363.
Young et al., Recent trends in deep learning based natural language processing. IEEE Computational Intelligence Magazine. arXiv:1708.02709v8. Nov. 2018. 32 pages.
Zhou et al., Calculating Unknown Eigenvalues with a Quantum Algorithm. Nature Photonics. 2013;7:223-8. DOI: 10.1038/NPHOTON.2012.360.
International Search Report and Written Opinion dated Nov. 24, 2021 in connection with International Application No. PCT/US2021/042882.
Harris et al., Linear programmable nanophotonic processors. Optica. 2018; 12(5):1623-1631.
Xie et al., Programmable optical processor chips: toward photonic RF filters with DSP-level flexibility and MHz-band selectivity. Nanophotonics. 2018;7(2):421-54. Retrieved from https://www.degruyter.com/document/doi/10.1515/nanoph-2017-0077/html.
PCT/US2021/042882, Nov. 24, 2021, International Search Report and Wrltten Opinion.

\* cited by examiner

SYSTEMS AND METHODS FOR UTILIZING PHOTONIC DEGREES OF FREEDOM IN A PHOTONIC PROCESSOR

CROSS-REFERENCE TO RELATED APPLICATIONS

This Application claims priority under 35 § USC 119(e) to U.S. Provisional Patent Application Ser. No. 63/056,494, filed Jul. 24, 2020, entitled "Systems and Methods for Utilizing Photonic Degrees of Freedom in a Photonic Processor," which is hereby incorporated herein by reference in its entirety.

BACKGROUND

Deep learning, machine learning, latent-variable models, neural networks and other matrix-based differentiable programs are used to solve a variety of problems, including natural language processing and object recognition in images. Solving these problems with deep neural networks typically requires long processing times to perform the required computation. The most computationally intensive operations in solving these problems are often mathematical matrix operations, such as matrix multiplication.

SUMMARY

Some embodiments are directed to a photonic processor. The photonic processor comprises: a multiplexer configured to multiplex, using at least one photonic degree of freedom, multiple encoded optical signals into a multiplexed optical signal; a detector coupled to an output of an optical path including the multiplexer, wherein the detector is configured to generate a first current based on the multiplexed optical signal or a demultiplexed portion of the multiplexed optical signal; and a modulator coupled to an output of the detector and configured to generate a second current by modulating the first current.

In some embodiments, the at least one photonic degree of freedom is one of a selection of wavelength, frequency, or polarization.

In some embodiments, the photonic processor further comprises a demultiplexer configured to demultiplex the multiplexed optical signal.

In some embodiments, the multiplexer is configured to multiplex in an optical domain and the demultiplexer is configured to demultiplex in the optical domain.

In some embodiments, the photonic processor further comprises a demultiplexer configured to demultiplex the second current.

In some embodiments, the multiplexer is configured to multiplex in an optical domain and the demultiplexer is configured to demultiplex in an RF domain.

In some embodiments, the photonic processor is a dual rail photonic processor.

In some embodiments, the photonic processor is single-ended.

Some embodiments are directed to a photonic device configured to perform a mathematical operation. The photonic device comprises: optical encoders; a multiplexer coupled to outputs of the optical encoders, wherein the multiplexer is configured to multiplex, using at least one photonic degree of freedom, encoded optical signals from the optical encoders into a multiplexed optical signal; detectors coupled to outputs of an optical path including the optical encoders and the multiplexer and configured to output first currents; modulators coupled to an output of two detectors of the detectors; and a controller coupled to the optical encoder and the modulators. The controller is configured to: obtain a first numeric values and second numeric values, control the optical encoders to generate the encoded optical signals by modifying input optical signals using the first numeric values, control the modulators to generate second currents based on the first currents, wherein controlling the modulators comprises setting a characteristic of the modulators based on the second numeric values, and obtain a result of the mathematical operation using the second currents.

In some embodiments, the at least one photonic degree of freedom is one of a selection of wavelength, frequency, or polarization.

In some embodiments, the photonic device further comprises a demultiplexer configured to demultiplex the multiplexed optical signal.

In some embodiments, the multiplexer is configured to multiplex in an optical domain and the demultiplexer is configured to demultiplex in the optical domain.

In some embodiments, the photonic device further comprises a demultiplexer configured to demultiplex the second currents.

In some embodiments, the multiplexer is configured to multiplex in an optical domain and the demultiplexer is configured to demultiplex in an RF domain.

In some embodiments, the photonic device is a dual rail photonic device.

In some embodiments, the photonic device is single-ended.

Some embodiments are directed to a method for performing a mathematical operation, the method comprising: obtaining first numeric values and second numeric values; generating encoded optical signals by modifying input optical signals using the first numeric values; multiplexing, using at least one photonic degree of freedom, the encoded optical signals to generate multiplexed optical signals; generating first currents by detecting, using detectors, the multiplexed optical signals or a demultiplexed portion of the multiplexed optical signals; and generating second currents, using modulators and the first currents, by setting a characteristic of the modulators based on the second numeric values; and obtaining a result of the mathematical operation using the second currents.

In some embodiments, multiplexing using at least one photonic degree of freedom comprises multiplexing using at least one of a selection of wavelength, frequency, or polarization.

In some embodiments, the method further comprises demultiplexing the multiplexed optical signals.

In some embodiments, the method further comprises demultiplexing the second currents.

BRIEF DESCRIPTION OF THE DRAWINGS

Various aspects and embodiments will be described with reference to the following figures. It should be appreciated that the figures are not necessarily drawn to scale. In the drawings, each identical or nearly identical component that is illustrated in various figures is represented by a like numeral. For purposes of clarity, not every component may be labeled in every drawing.

DETAILED DESCRIPTION

I. Overview

Figure 1:
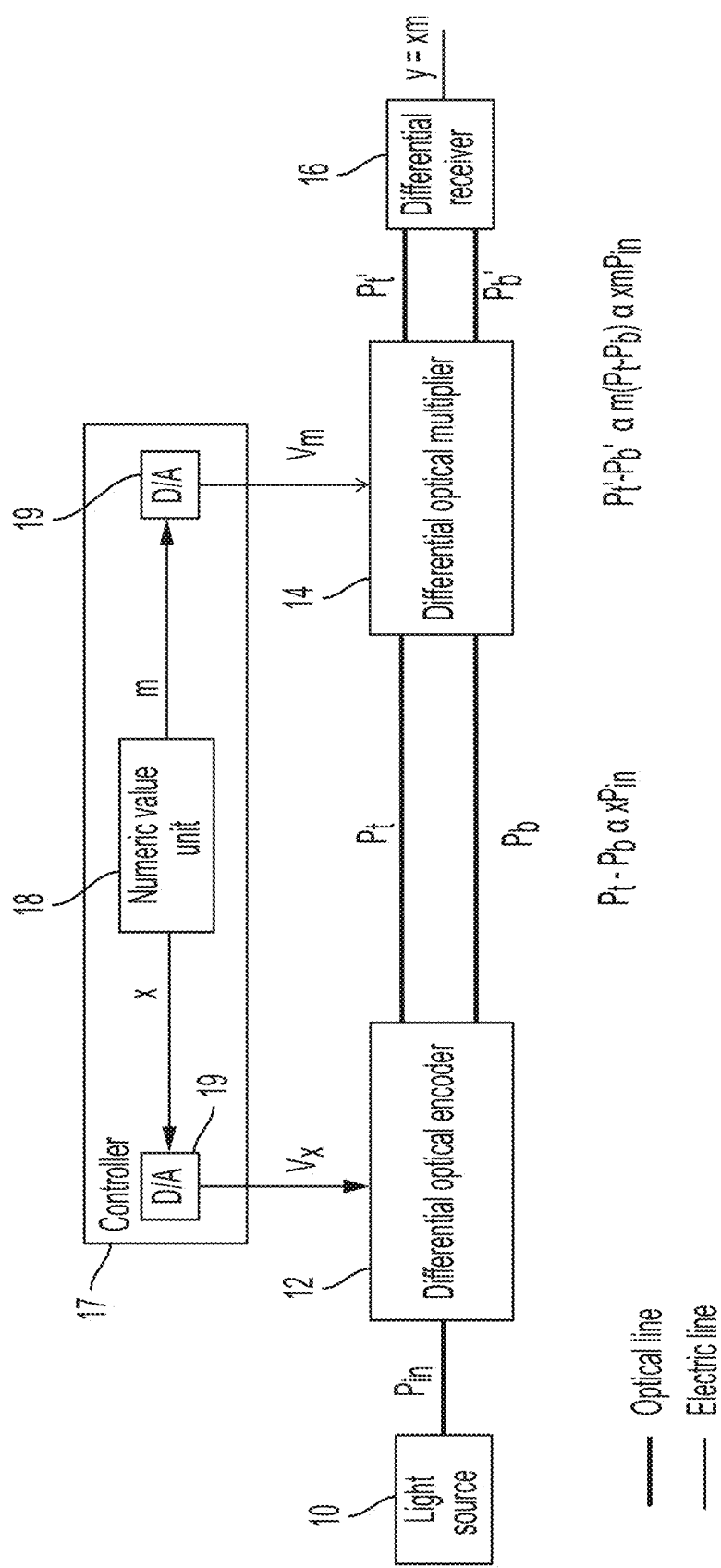
FIG. 1 is a block diagram illustrating a dual-rail optical multiplier, in accordance with some embodiments of the technology described herein.

Conventional electronic processors face severe speed, power, and efficiency limitations primarily due to the inherent presence of impedance in electronic interconnects. Connecting multiple processor cores and/or connecting a processor core to a memory involves the use of conductive traces. Large values of impedance limit the maximum rate at which data can be transferred through the conductive traces with a negligible bit error rate. For processing that requires billions of operations, these delays can result in a significant loss of performance. In addition to electrical circuits' inefficiencies in speed, the heat generated by the dissipation of energy caused by the impedance of the circuits is also a barrier in developing electronic processors.

The inventors have recognized and appreciated that using optical signals (instead of, or in combination with, electrical signals) overcomes the aforementioned problems with electronic computing. Optical signals travel at the speed of light in the medium in which the light is traveling. Thus, the latency of optical signals is far less of a limitation than electrical propagation delay. Additionally, no power is dissipated by increasing the distance traveled by the light signals, opening up new topologies and processor layouts that would not be feasible using electrical signals. Thus, photonic processors offer far better speed and efficiency performance than conventional electronic processors.

The inventors have recognized and appreciated that photonic processors are well-suited for particular types of algorithms. For example, many machine learning algorithms (e.g. support vector machines, artificial neural networks and probabilistic graphical model learning) rely heavily on linear transformations on multi-dimensional arrays/tensors. The simplest linear transformation is a matrix-vector multiplication, which using conventional algorithms has a complexity on the order of $O(N^2)$, where N is the dimensionality of a square matrix being multiplied by a vector of the same dimension. The inventors have recognized and appreciated that a photonic processor can perform linear transformations, such as matrix multiplication, in a highly parallel manner by propagating a particular set of input optical signals through a configurable array of active optical components. Using such implementations, matrix-vector multiplication of dimension N=512 can be completed in hundreds of picoseconds, as opposed to the tens to hundreds of nanoseconds using conventional electronic circuit-based processing.

General matrix-matrix (GEMM) operations are ubiquitous in software algorithms, including those for graphics processing, artificial intelligence, neural networks and deep learning. GEMM calculations in today's computers are typically performed using transistor-based systems such as GPU systems or systolic array systems. Matrix-vector multiplication using photonics arrays can be highly power efficient when compared to their electronic counterparts as optical signals can propagate within a semiconductor substrate with a minimal amount of loss.

The inventors, however, have recognized and appreciated a number of challenges associated with accelerating the computational speed and increasing the computation density of such photonic arrays. First, the inventors have recognized and appreciated that the throughput of a photonic processor can be increased by multiplexing and demultiplexing input vector signals based on at least one photonic degree of freedom (DOF). A photonic DOF is an independent parameter (e.g., polarization, wavelength, frequency) used to represent a photonic signal. To multiplex input photonic vector signals, for example, the input photonic vector signals may be multiplexed in the optical domain according to wavelength and/or polarization of the input signals. The multiplexed signal may then be demultiplexed in the optical domain using multiple wavelengths and/or polarizations to increase the throughput of the photonic processor. Alternatively, the inventors have developed techniques for performing multiplication operations and subsequent demultiplexing in the analog RF domain.

Second, the inventors have recognized and appreciated that performing multiplexing and demultiplexing both in the optical domain enables an improved density of electronic components in the photonic processor architecture. For example, detectors may be positioned closer to one another in such a photonic processor, thereby reducing the capacitance of the wires connecting the detectors. Such a reduction in capacitance is important because the wire capacitance limits the output bandwidth of the photonic processor.

Third, the inventors have recognized and appreciated that by performing multiplexing in the optical domain and demultiplexing in the analog RF domain, parallel matrix multiplication on multiple input vectors may be performed simultaneously. For a photonic processor using N different wavelengths to encode N different input vectors, N matrix-vector multiplications may be performed simultaneously without the need for any additional photonic modulators or modulatable photodetectors. Accordingly, the techniques described herein can increase the throughput of a photonic processor by a factor of N without increasing the number of photonic and electronic components needed or the amount of power consumed by the photonic processor.

The inventors have accordingly developed novel high-throughput photonic processing architectures for performing matrix-matrix multiplication operations (including matrix-vector multiplication, a core component of GEMM operations). According to an aspect of the present disclosure, the architecture described herein performs multiplexing (e.g., in the optical domain) and demultiplexing (e.g., in the optical domain or the analog RF domain) to perform optical processing in a highly-parallel fashion. In some embodiments, the photonic processor includes optical encoders configured to generate encoded optical signals based on first numeric values (e.g., vector values x) and a multiplexer configured to multiplex, using at least one optical degree of freedom (DOF; e.g., wavelength, frequency, polarization, etc.), the encoded optical signals from the optical encoders into a multiplexed optical signal. The photonic processor also includes detectors coupled to outputs of an optical path including the optical encoders and the multiplexer (e.g., such that the detectors receive the multiplexed optical signal or a demultiplexed portion of the multiplexed optical signal from the optical path). The detectors are configured to convert a received optical signal into a first current (e.g., a photocurrent) received by modulators configured to output second currents based on the received first currents from the detectors and second numeric values (e.g., matrix values M).

The photonic processor may additionally, in some embodiments, include a controller coupled to the optical encoders and the modulators. The controller is configured to obtain the first and second numeric values and to control the optical encoders and the modulators to generate the encoded optical signals and second currents, respectively, based on the first and second numeric values. For example, the controller controls the optical encoders to generate the encoded optical signals by, for example, controlling the optical encoders to modify input optical signals using the first numeric values. The controller also controls the modulators to generate the second currents by setting a characteristic of the modulators based on the second numeric values. Thereafter, the controller may obtain a result of a mathematical operation (e.g., matrix-matrix multiplication, matrix-vector multiplication) using the second currents output by the modulators (e.g., by performing a summation, difference, multiplication or other computation as described herein).

In some embodiments, the photonic processor further includes a demultiplexer configured to demultiplex the multiplexed optical signal. In such embodiments, the multiplexer is configured to multiplex in an optical domain and the demultiplexer is configured to demultiplex in the optical domain. Alternatively, in some embodiments, the photonic processor includes a demultiplexer configured to demultiplex the second current. In such embodiments, the multiplexer is configured to multiplex in an optical domain and the demultiplexer is configured to demultiplex in an analog RF domain.

In some embodiments, the photonic processor is a single-ended photonic processor configured to encode data into a single-ended optical signal. In some embodiments, the photonic processor is a dual-rail photonic processor configured to process optical signals in a differential fashion. In such embodiments, the data is encoded in the difference between a pair of optical signals (e.g., in the difference between the amplitudes or powers of the optical signals).

Following below are more detailed descriptions of various concepts related to, and embodiments of, optical chips and/or packages for realizing high power, single mode optical outputs. It should be appreciated that various aspects described herein may be implemented in any of numerous ways. Examples of specific implementations are provided herein for illustrative purposes only. In addition, the various aspects described in the embodiments below may be used alone or in any combination and are not limited to the combinations explicitly described herein.

II. Performing Mathematical Operations Using Photonic Circuits

FIG. 1 is a block diagram illustrating an optical multiplier implemented based on a dual-rail architecture, in accordance with some embodiments. This optical multiplier includes a light source 10, a differential optical encoder 12, a differential optical multiplier 14, a differential receiver 16 and a controller 17. Controller 17 includes a pair of digital-to-analog converters (D/A) 19 and a numeric value unit 18.

Numeric value unit 18 produces a pair of scalar numeric values: x and m. Numeric value m is also referred to as "weight" or "weight parameter" and numeric value x is also referred to herein as "input data," "input value" or "input parameter." These numeric values may be produced based on data received by the controller, including data obtained from a memory internal to controller 17 and/or data provided to controller 17 from another computing system. These numeric values may be represented using any digital representation, including fixed-point or floating-point representations. The first D/A 19 converts numeric value x to an electric signal representative of x. In this example, the D/A produces a voltage $V_x$. The second D/A 19 converts numeric value m to an electric signal representative of m. In this example, the D/A produces a voltage $V_m$. In some embodiments, $V_x$ is proportional to x. In some embodiments, $V_m$ is proportional to m. The dual-rail optical multiplier of FIG. 1 is configured to multiply these numeric values to one another, thereby producing the result x×m.

Light source 10 may be implemented using a coherent source, e.g., a laser. Alternatively, light source 10 may be implemented using an incoherent source, e.g., a light-emitting diode, a source of amplified spontaneous emission, or a source of stimulated emission having a relatively large linewidth. As used herein, the terms "coherence" and "coherent" refers to temporal coherence. The optical power produced by light source 10 is identified as "$P_{in}$."

Differential optical encoder 12 receives a voltage $V_x$, and in response, produces a pair of optical signals. The labels "$P_t$" and "$P_b$" identify the optical powers of these optical signals, respectively. Differential optical encoder 12 receives voltage $V_x$, and encodes the optical signal received from light source 10 based on $V_x$. More specifically, differential optical encoder 12 produces a pair of optical signals in such a way that the difference between the powers of these optical signals ($P_t$–$P_b$) is proportional to both x and $P_{in}$ (in FIG. 1, the symbol "$\propto$" means "is proportional to"). It should be appreciated that this architecture is referred to as "dual-rail" in that x is encoded in the difference between two optical signals (the difference in the signal powers as in this example, or in other examples, the difference between the signal amplitudes). Differential optical encoder 12 may be implemented using any suitable optical modulator, including an optical interferometer (such as a tunable directional coupler or a Mach-Zehnder interferometer), a resonant modulator, a Franz-Keldysh modulator, etc. Examples of differential optical encoder 12 are described in detail further below.

As discussed above, $P_t$ identifies the power of the optical signal at the top rail and $P_b$ identifies the power of the optical signal at the bottom rail. In some embodiments, the rails are defined in terms of physical channels. In one example, the top rail is defined in a first optical waveguide and the bottom rail is defined in a second optical waveguide that is physical distinct from the first optical waveguide. In another example, the top rail is defined in a first free-space optical channel and the bottom rail is defined in a second free-space optical channel that is spatially separated from the first free-space optical channel. In other embodiments, however, the top and bottom rails may be defined by a common physical channel. That is, the optical signals generated by differential optical encoder 12 share the same optical waveguide or free-space channel. In these embodiments, the optical signal of each rail is distinguishable from the optical signal of the other rail by a certain optical characteristic, such as by the time bin, polarization or wavelength. In one example, the optical signal at the first rail is defined by a first polarization mode of an optical waveguide (e.g., the optical waveguide's $TE_{00}$-mode) and the optical signal at the second rail is defined by a second polarization mode of the same optical waveguide (e.g., the optical waveguide's $TE_{01}$-mode or $TM_{00}$-mode). In another example, the optical signal at the first rail is defined by a first wavelength and the optical signal at the second rail is defined by a second wavelength.

It should be appreciated that, while FIG. 1 depicts an architecture in which the signals representing the numeric values to be multiplied are voltages ($V_x$ and $V_m$), in other embodiments, the numeric values may be represented using other types of electrical signals, such as electric currents or electric charges.

Differential optical multiplier 14 receives the optical signals produced by differential optical encoder 12 and produces a pair of output optical signals based on the voltage $V_m$. The powers of the output optical signals are labeled "$P'_t$" and "$P'_b$," respectively. The optical signals produced by differential optical multiplier 14 are such that the difference between their powers ($P'_t$–$P'_b$) is proportional to both m and the difference $P_t$–$P_b$. The result is that the quantity $P'_t$–$P'_b$ is proportional to each of m, x and $P_{in}$. Being proportional to both x and m, $P'_t$–$P'_b$, in essence, is encoded with the product of numeric value x times numeric value m.

Differential optical multiplier 14 may be implemented using any suitable photonic device, including any suitable optical interferometer such as an adjustable directional coupler or a Mach-Zehnder interferometer.

Differential receiver 16 detects optical signals $P'_t$ and $P'_b$ and, in response, produces a numeric value y that is equal to the product x×m. To perform this operation, receiver 16 may include for example a pair of balanced photodetectors, a differential trans-impedance amplifier configured to generate an output voltage proportional to $P'_t$–$P'_b$, and an analog-to-digital converter configured to convert the output voltage to a numeric value y.

Figure 2:
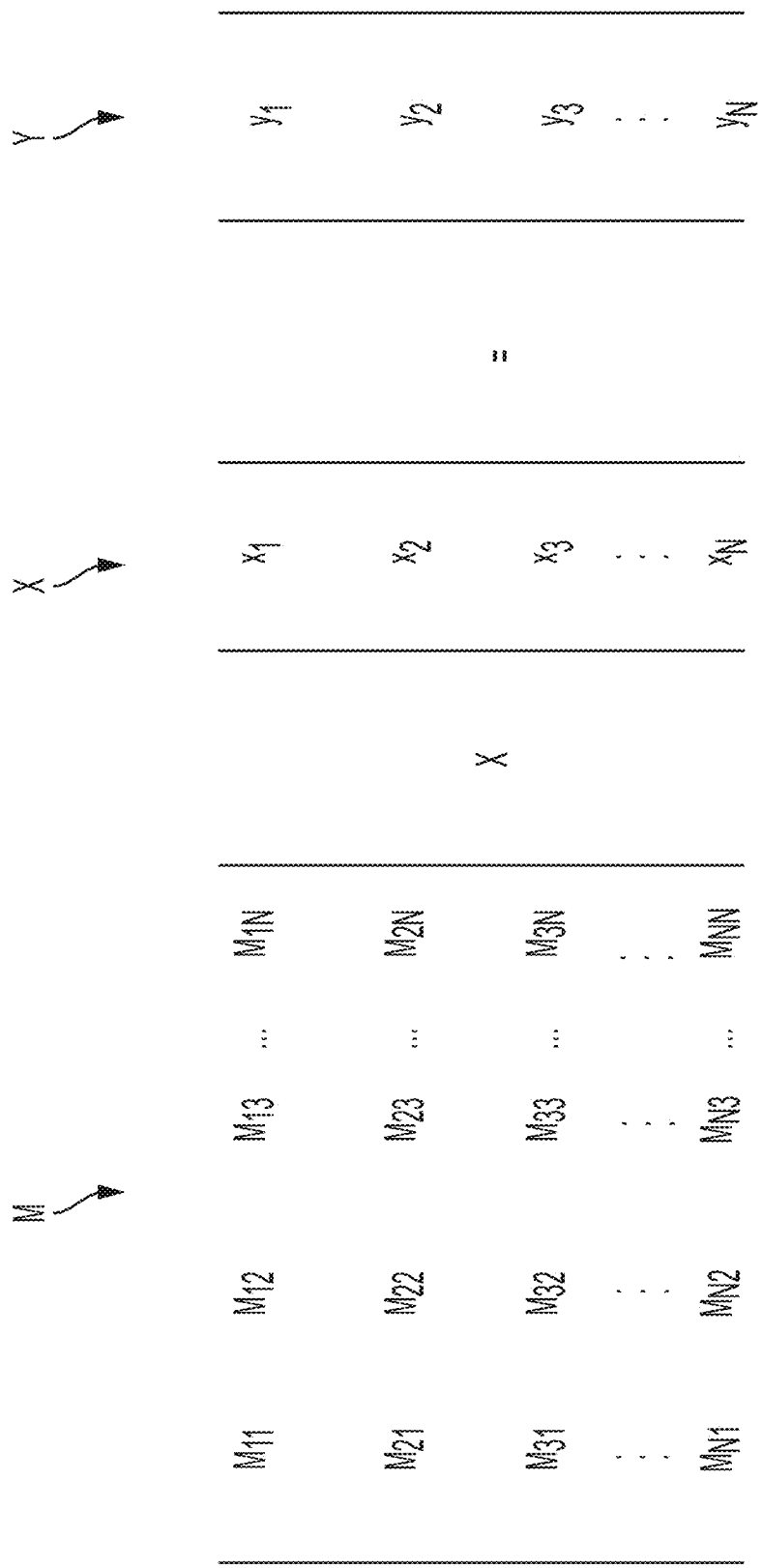
FIG. 2 is a representation of a matrix-vector multiplication, in accordance with some embodiments of the technology described herein.

The dual-rail multiplier of FIG. 1 performs scalar multiplications (x times m). However, many machine learning algorithms rely on matrix-matrix (e.g., matrix-vector) multiplication. Some embodiments relate to photonic processors configured to perform matrix-matrix (e.g., matrix-vector) multiplications using the dual-rail optical multipliers described above. These photonic processors are configured to multiply a matrix M by a vector X to produce a vector Y. Matrix M is also referred to herein as "weight matrix," vector X is also referred to herein as "input vector" and vector Y is also referred to herein as "output vector." FIG. 2 illustrates an example of such a multiplication. In this example, M is an N×N matrix, though embodiments of the present application are not limited to square matrices or to any specific dimension.

Figure 3:
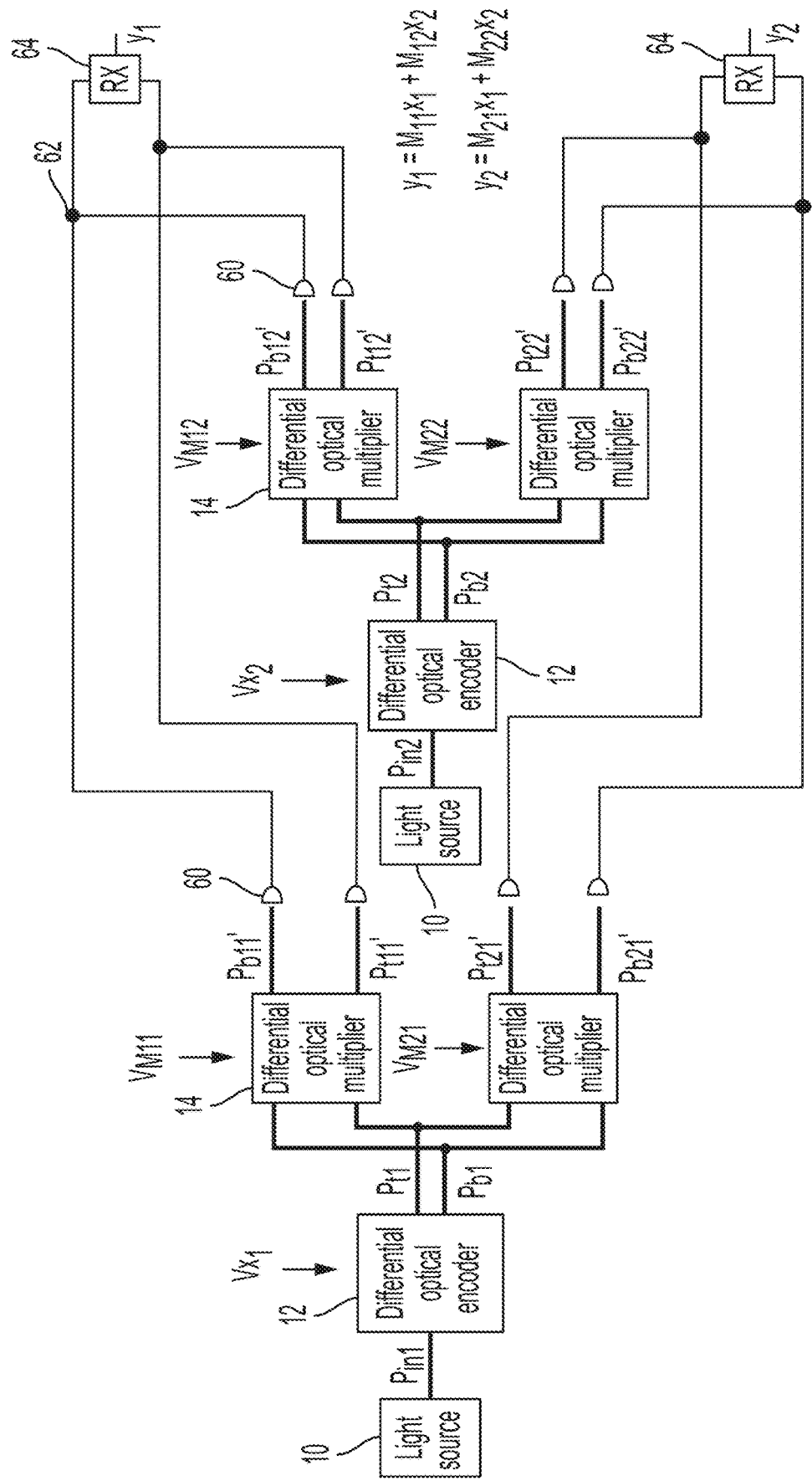
FIG. 3 is a block diagram of a photonic processor arranged according to a 2×2 configuration, in accordance with some embodiments.

An example of a dual-rail photonic processor is depicted in FIG. 3, in accordance with some embodiments. In this implementation, the photonic processor is configured to multiply a 2×2 matrix (M) by a 2×1 input vector (X) to obtain a 2×1 output vector (Y). A first light source 10 provides an input optical signal having power $P_{in1}$ and a second light source 10 provides an input optical signal having power $P_{in2}$ (although the same light source may be used in some embodiments). $P_{in2}$ may be equal to or different from $P_{in1}$. Each light source is followed by a differential optical encoder 12, which operates in the manner described in connection with the differential optical encoder of FIG. 1. The first differential optical encoder receives voltage $V_{x1}$, which is representative of numeric value $x_1$. This differential optical encoder encodes the received input optical signal using voltage $V_{x1}$ to generate a pair of encoded optical signals having powers $P_{t1}$ and $P_{b1}$. These optical signals are provided as inputs to two differential optical multipliers 14. The top differential optical multiplier receives voltage $V_{M11}$, which represents numeric value $M_{11}$. The bottom differential optical multiplier receives voltage $V_{M21}$, which represents numeric value $M_{21}$. Both differential optical multipliers operate in the manner described in connection with the differential optical multiplier of FIG. 1. The top differential optical multiplier outputs optical signals $P'_{b11}$ and $P'_{t11}$, and the bottom differential optical multiplier outputs optical signals $P'_{b21}$ and $P'_{t21}$. The difference between $P'_{b11}$ and $P'_{t11}$ is proportional to both $M_{11}$ and the difference between $P_{b1}$ and $P_{t1}$, and accordingly, is proportional to the product $M_{11}x_1$. Similarly, the difference between $P'_{b21}$ and $P'_{t1}$ is proportional to both $M_{21}$ and the difference between $P_{b1}$ and $P_{t1}$, and accordingly, is proportional to the product $M_{21}x_1$. The four output optical signals are detected using respective photodetectors 60.

The second differential optical encoder receives voltage $V_{x2}$, which is representative of numeric value $x_2$. This differential optical encoder encodes the received input optical signal using voltage $V_{x2}$ to generate a pair of encoded optical signals having powers $P_{r2}$ and $P_{b2}$. These optical signals are provided as inputs to two differential optical multipliers 14. The top differential optical multiplier receives voltage $V_{M12}$, which represents numeric value $M_{12}$. The bottom differential optical multiplier receives voltage $V_{M22}$, which represents numeric value $M_{22}$. Both differential optical multipliers operate in the manner described in connection with the differential optical multiplier of FIG. 1. The top differential optical multiplier outputs optical signals $P'_{b12}$ and $P'_{r12}$, and the bottom differential optical multiplier outputs optical signals $P'_{b22}$ and $P'_{r22}$. The difference between $P'_{b12}$ and $P'_{r12}$ is proportional to both $M_{12}$ and the difference between $P_{b2}$ and $P_{r2}$, and accordingly, is proportional to the product $M_{12}x_2$. Similarly, the difference between $P'_{b22}$ and $P'_{r22}$ is proportional to both $M_{22}$ and the difference between $P_{b2}$ and $P_{r2}$, and accordingly, is proportional to the product $M_{12}x_2$. The four output optical signals are detected using respective photodetectors 60.

As shown in FIG. 3, the outputs of the photodetectors are combined (see, e.g., node 62), thereby allowing the photocurrents to be added to one another. Receiver circuitry 64 receives the photocurrents produced by detectors 60. Receiver circuitry 64 includes a differential trans-impedance amplifier (or other circuits for subtracting the first input current from the second input current) and an analog-to-digital converter. The top receiver circuitry 64 outputs numeric value $y_1=M_{11}x_1+M_{12}x_2$. The bottom receiver circuitry 64 outputs numeric value $y_2=M_{21}x_1+M_{22}x_2$. Additional aspects of dual-rail photonic processors are described by U.S. Patent Application Publication No. 2021/0157878, titled "Linear Photonic Processors and Related Methods," filed on Nov. 23, 2020 and incorporated by reference herein in its entirety.

Figure 4:
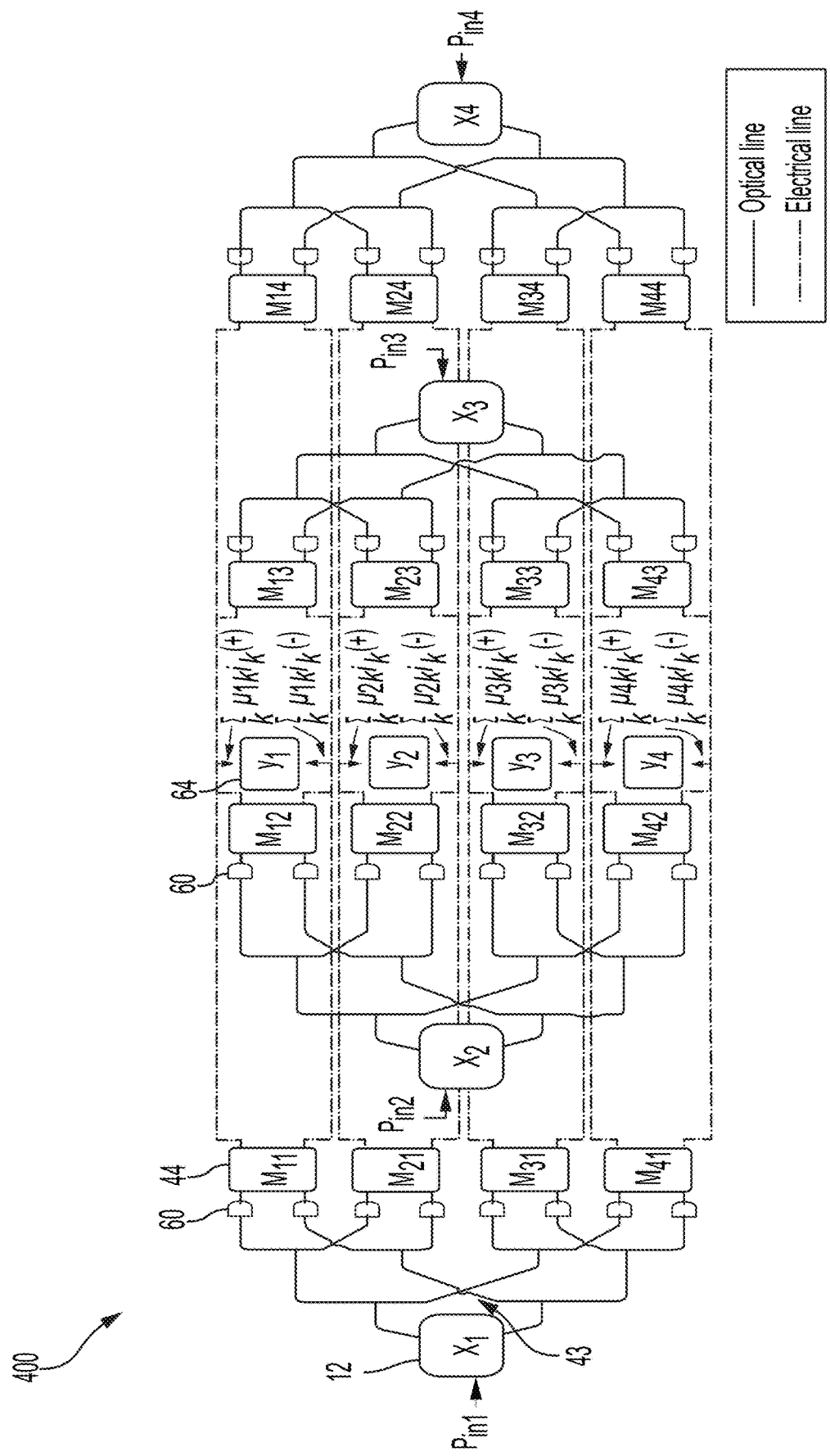
FIG. 4 is a block diagram of a photonic processor arranged according to a 4×4 configuration, in accordance with some embodiments of the technology described herein.

An example of a 4×4 dual-rail photonic processor 400 is illustrated in FIG. 4. Unlike the examples of FIGS. 1-3, the dual-rail photonic processor 400 is configured to perform multiplication operations in the analog RF domain rather than the optical domain. The processor 400 includes four light sources 10 (not shown), four differential encoders 12 (which encode numeric values $x_1$, $x_2$, $x_3$, and $x_4$ into respective pairs of dual-rail optical signals), sixteen differential analog RF modulators 44 (which multiply the respective inputs by $M_{11}$, $M_{21}$, $M_{31}$, $M_{41}$, $M_{12}$, $M_{22}$, $M_{32}$, $M_{42}$, $M_{13}$, $M_{23}$, $M_{33}$, $M_{43}$, $M_{14}$, $M_{24}$, $M_{34}$ and $M_{44}$), thirty-two detectors 60 (which convert optical signals into photocurrents), and four receivers 64.

In some embodiments, the detectors 60 convert the optical signals from the differential encoders 12 into photocurrents. The differential analog RF modulators 44 includes analog RF circuitry configured to modulate the two photocurrents ($i_k^{(+)} \propto I_k^{(+)} \propto |E_k^{(+)}|^2$ and $i_k^{(-)} \propto I_k^{(-)} \propto |E_k^{(-)}|^2$) received from the detectors 60. In some embodiments, the differential analog RF modulators 44 include controllable current dividers. For example, the differential analog RF modulators 44 may comprise one or more current branches (e.g., two current branches), each with a controllable conductance. During operation, each input photocurrent may be split between the current branches of the differential analog RF modulators 44, and by controlling the ratio of conductances of the current branches, a proportion of the input photocurrent flowing in each of the output current branches may be controlled. In some embodiments, the differential analog RF modulators 44 output electronic current signals $\mu_{jk}i_k^{(+)}$ and $\mu_{jk}i_k^{(-)}$ whose difference is proportional to the desired multiplication between the matrix element $M_{jk}$ and the input vector element $x_k$:

$$M_{jk}x_k \propto \mu_{jk}i_k^{(+)}-\mu_{jk}i_k^{(-)}=\mu_{jk}(i_k^{(+)}-i_k^{(-)}).$$

Taking the difference between the current signals in the analog domain and then connecting all the k current signals $\mu_{jk}i_k^{(+)}-\mu_{jk}i_k^{(-)}$ together using electronic wires allows the performance of the summation between the different k values of $M_{jk}x_k$. As such, the differential analog RF multipliers 44 and associated circuitry 64 shown in FIG. 4 can compute the output vector y, which is the matrix-vector multiplication between a matrix M and a vector x. In some embodiments, the circuitry 64 includes circuitry configured to receive two input currents (e.g., from differential analog RF modulators 44) and output an electrical signal proportional to the difference between the two input currents.

Figure 5:
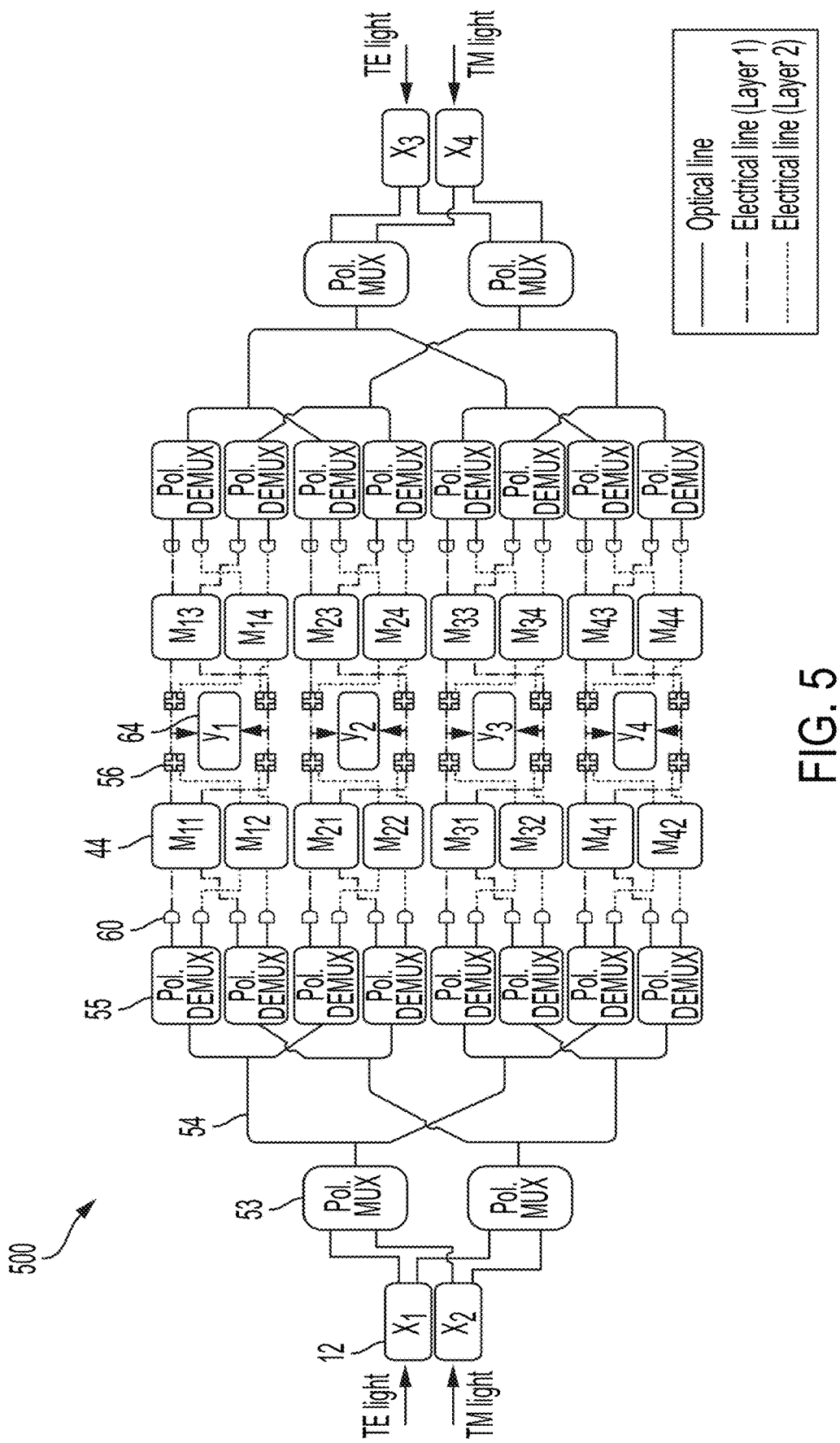
FIG. 5 is a block diagram of a photonic processor arranged according to a 4×4 configuration and including polarization multiplexing, in accordance with some embodiments of the technology described herein.

III. Photonic Processors with Optical Domain Multiplexing and Demultiplexing FIG. 5 is a block diagram of a photonic processor 500 arranged according to a 4×4 configuration and including polarization multiplexing, in accordance with some embodiments of the technology described herein. Photonic processor 500 includes four light sources 10 (not shown), the received optical signals of which can be generated from a single light source having a specific frequency. In some embodiments, the different polarizations of the input optical signals can be generated from the single light source and a polarization rotator. The light sources 10 may be configured to produce light of two different polarizations (e.g., TE and TM light) and two different wavelengths. The differential encoders 12 encode numeric values $x_1$, $x_2$, $x_3$, and $x_4$ into respective pairs of dual-rail optical signals having different polarizations and wavelengths. The encoded optical signals from the top rail of each differential encoder 12 are multiplexed into a single waveguide by a polarization multiplexer 53, and the encoded optical signals on the bottom rail of each differential encoder 12 are multiplexed by another polarization multiplexer 53 into another waveguide. It should be appreciated that, while the example of FIG. 5 shows two optical signals of differing polarizations and wavelengths being multiplexed together, that in some embodiments two or more optical signals of differing polarizations and/or wavelengths may be multiplexed together by polarization multiplexer 53, as aspects of the technology described herein are not limited in this respect.

In some embodiments, outputs of the polarization multiplexers 53 are coupled to a binary splitter tree 54. Each waveguide in the binary splitter tree 54 carries two different multiplexed optical signals that can be differentiated by their wavelength or polarization. The binary splitter tree 54 includes multiple 3 dB optical splitters and multiple optical waveguide crossings so that the multiplexed optical signals from the polarization multiplexers 53 may be transmitted to multiple polarization demultiplexers 55. The polarization demultiplexers 55 are configured to demultiplex a received multiplexed optical signal into two separate waveguides (e.g., into two spatial modes). Each demultiplexed optical signal thereafter is detected by a corresponding photodetector 60 and converted into a first current (e.g., a photocurrent). The first currents are modulated by a respective differential analog RF modulator 44. The differential analog RF modulators 44 are configured to generate second currents representative of a product of a vector and a matrix element. The second currents are thereafter summed by circuitry 64, as previously described in connection with the example of FIG. 4, and output.

In some embodiments, polarization multiplexer 53 and/or polarization demultiplexer 55 include polarization rotators, polarization splitters, and/or polarization combiners. Alternatively, in some embodiments, photonic inverse design methods can be used to design non-resonant passive multiplexer and demultiplexer devices for using both wavelength and polarization as photonic degrees of freedom.

Figure 6A:
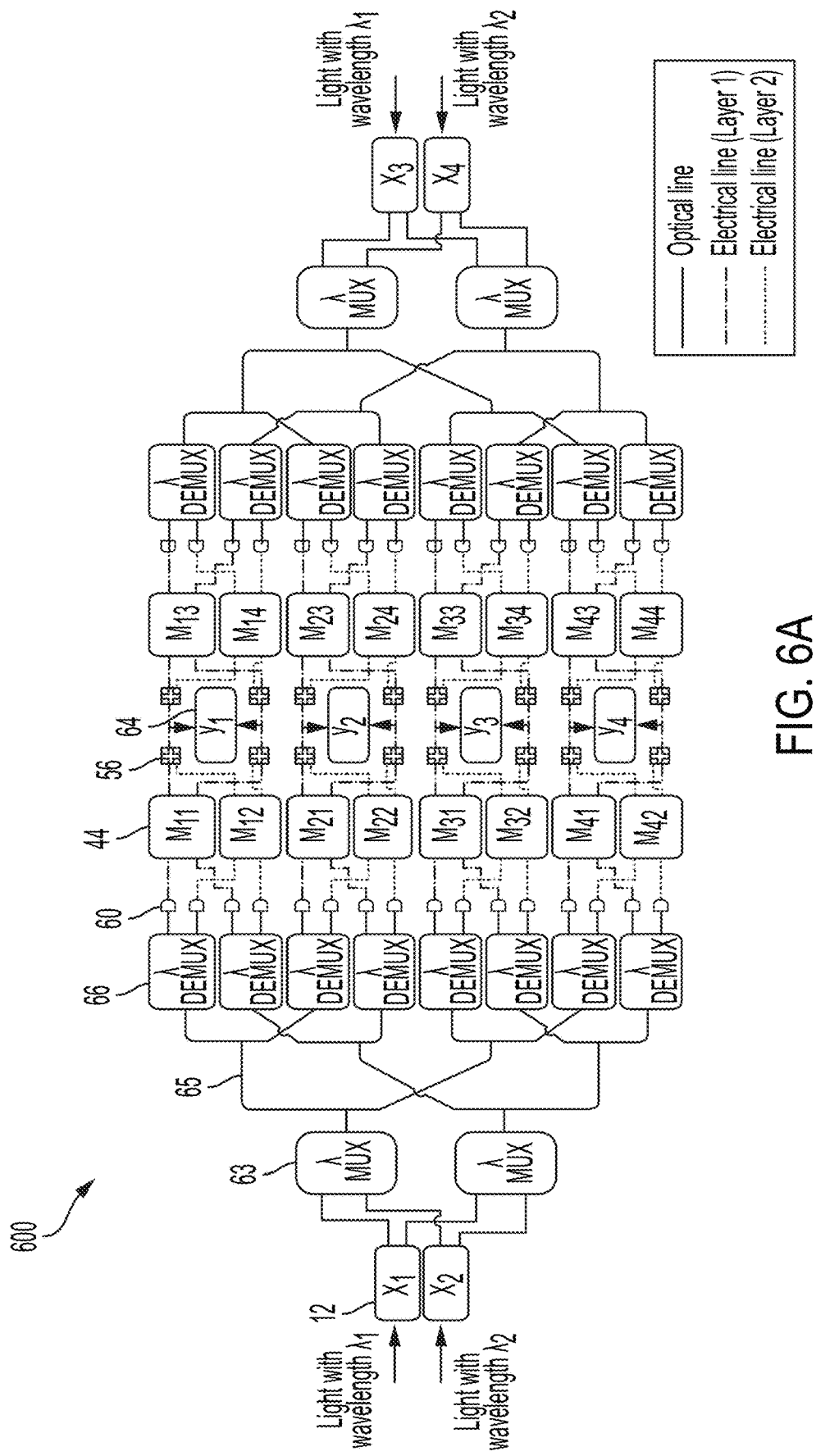
FIG. 6A is a block diagram of a photonic processor arranged according to a 4×4 configuration and including wavelength multiplexing, in accordance with some embodiments of the technology described herein.

FIG. 6A is a block diagram of a photonic processor 600 arranged according to a 4×4 configuration and including wavelength multiplexing, in accordance with some embodiments of the technology described herein. Photonic processor 600 includes four light sources 10 (not shown) configured to produce light of two different wavelengths, $\lambda_1$ and $\lambda_2$. The received light from light sources 10 may be generated by two different light sources, each having a different wavelength, in some embodiments. Photonic processor 600 includes differential encoders 12 configured to encode numeric values $x_1$, $x_2$, $x_3$, and $x_4$ into the received light from light sources 10 and outputting respective pairs of dual-rail optical signals having different polarizations and wavelengths. The encoded optical signals from the top rail of each differential encoder 12 are multiplexed into a single waveguide by a wavelength multiplexer 63, and the encoded optical signals on the bottom rail of each differential encoder 12 are multiplexed by another wavelength multiplexer 63 into another waveguide.

In some embodiments, outputs of the wavelength multiplexers 63 are coupled to a binary splitter tree 65. Each waveguide in the binary splitter tree 65 carries two different multiplexed optical signals that can be differentiated by their wavelength or polarization. The binary splitter tree 65 includes multiple 3 dB optical splitters and multiple optical waveguide crossings so that the multiplexed optical signals from the wavelength multiplexers 63 may be transmitted to multiple wavelength demultiplexers 66. The wavelength demultiplexers 66 are configured to demultiplex a received multiplexed optical signal into two separate waveguides (e.g., into two optical signals with two different wavelengths). Each demultiplexed optical signal thereafter is detected by a corresponding photodetector 60 and converted into a first current (e.g., a photocurrent). The first currents are modulated by a respective differential analog RF modulator 44. The differential analog RF modulators 44 are configured to generate second currents representative of a product of a vector and a matrix element. The second currents are thereafter summed by circuitry 64, as previously described in connection with the example of FIG. 4, and output.

In some embodiments, more than two different wavelengths may be multiplexed together into a single waveguide. Alternatively or additionally, both the wavelength DOF and the polarization DOF may be made use of to increase throughput of the photonic processor 600. Each of optical signal can be regarded as a signal with an electromagnetic mode labeled by a tuple $(\lambda, \vec{k})$, where $\lambda$ is the wavelength and $\vec{k}$ is the polarization. Each optical signal with a unique value of $\lambda$ and a unique value of $\vec{k}$ is orthogonal to other optical modes. Thus, this optical signal can be multiplexed with other signals having different values of $(\lambda, \vec{k})$ and can be demultiplexed from the other signals.

In some embodiments, wavelength multiplexer 63 and/or wavelength demultiplexer 66 comprise ring resonators. The ring resonators may each be tuned to be resonant to a specific wavelength such that the ring performs multiplexing or demultiplexing for that wavelength. In some embodiments, wavelength multiplexer 63 and/or wavelength demultiplexer 66 may be associated with temperature stabilization circuitry (not shown). The temperature stabilization circuitry may be configured to maintain a stable temperature of the ring resonators within wavelength multiplexer 63 and/or wavelength demultiplexer 66, thereby enabling the wavelength multiplexer 63 and/or wavelength demultiplexer 66 to operate reliably as slight changes in temperatures can shift the resonant frequency of ring resonators.

A photonic architecture as described in connection with the examples of FIGS. 5 and 6A significantly reduces the distance traveled by the output first and second currents through electrical wires. The bandwidth of the photonic processor 400 of FIG. 4 is limited by the bandwidth determined by the resistance and the capacitance of the electrical wires. The compact arrangement of photonic processors 500 and 600 reduces the wire resistance and capacitance by reducing the electrical wire length compared to that of the photonic processor 400 such that the bandwidth of the system is improved. Additionally, the output signals generated by photonic processors 500 and 600 have a higher signal-to-noise ratio (SNR) because the reduced wire resistance decreases the signal loss and noise introduced by the wires. Such an advantage is evident in typical CMOS-based silicon photonics fabrication processes where there is only one layer where silicon can be drawn, such that each photonic device must have its own unique coordinates in the 2-D plane. For future photonic fabrication processes where photonic devices can be stacked on top of each other, the advantages of the multiplexing/demultiplexing scheme can be achieved by having two or more modulators or detectors placed on top of one another.

It should be appreciated that in some embodiments of photonic processors 500 and/or 600, the top (+) rail signals and the bottom (−) rail signals need not be multiplexed together. Alternatively, in some embodiments, the top (+) signal from one differential optical encoder 12 may be multiplexed with the bottom (−) signal from another differential optical encoder 12. The demultiplexing operation only requires the distinction between the mode numbers of the optical signals that have been multiplexed together. In this case, that mode number is labeled by the tuple $(\lambda, \vec{k})$.

In some embodiments, multiplexing and demultiplexing can be used in place of the binary splitter trees 54, 65, which may have multiple photonic crossings that can introduce loss or crosstalk. In such embodiments, one of the two signal outputs from each differential optical encoder 12 can have its polarization rotated such that one polarization carries the (+) value of the signal and the other polarization carries the (−) value of the signal. In this manner, the binary splitter trees 54, 65 may be simplified or replaced in some embodiments.

Figure 6B:
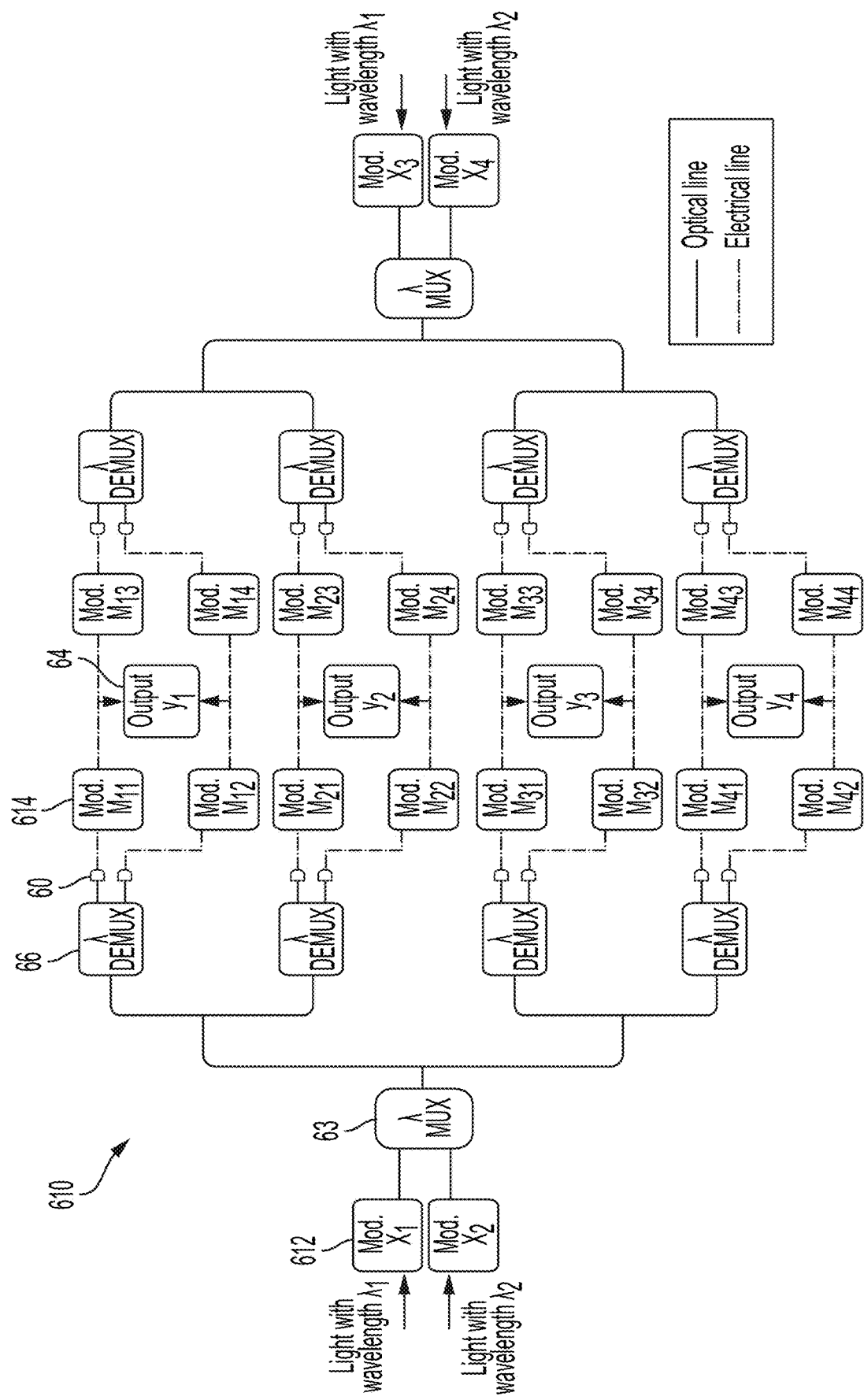
FIG. 6B is a block diagram of a single-ended photonic processor including wavelength multiplexing, in accordance with some embodiments of the technology described herein.

FIG. 6B is a block diagram of a single-ended photonic processor 610 including wavelength multiplexing, in accordance with some embodiments of the technology described herein. Photonic processor 610 is a single-ended variation of photonic processor 600 described in connection with FIG. 6A. Photonic processor 610 includes four light sources 10 (not shown) configured to produce light of two different wavelengths, $\lambda_1$ and $\lambda_2$. The received light from light sources 10 may be generated by two different light sources, each having a different wavelength, in some embodiments. Photonic processor 610 includes encoders 612 configured to encode numeric values $x_1$, $x_2$, $x_3$, and $x_4$ into the received light from light sources 10 and to each output a single encoded optical signal. The encoded optical signals from each encoder 612 is multiplexed into a single waveguide by a wavelength multiplexer 63.

In some embodiments, outputs of the wavelength multiplexers 63 are coupled to multiple wavelength demultiplexers 66. The wavelength demultiplexers 66 are configured to demultiplex a received multiplexed optical signal into two separate waveguides (e.g., into two optical signals with two different wavelengths). Each demultiplexed optical signal thereafter is detected by a corresponding photodetector 60 and converted into a first current (e.g., a photocurrent). The first currents are modulated by a respective analog RF modulator 614. The analog RF modulators 614 are configured to generate second currents representative of a product of a vector and a matrix element. The second currents are thereafter summed by circuitry 64.

It should be appreciated that the photonic processors 500, 620, and 700 may similarly be adapted to a single-ended architecture as photonic processor 600 was adapted in the example of photonic processor 610, as aspects of the technology described herein are not limited in this respect.

Figure 6C:
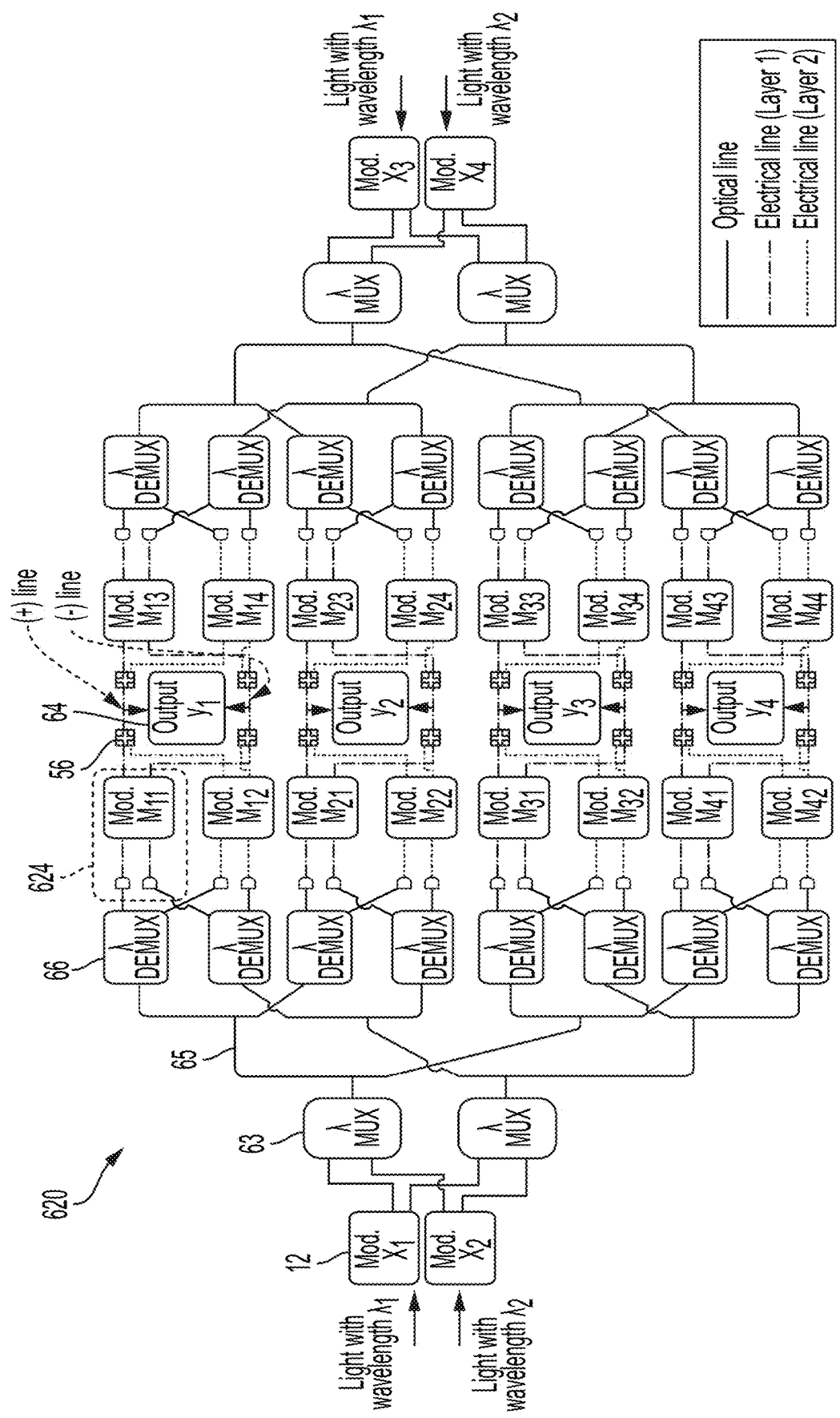
FIG. 6C is a block diagram of a photonic processor arranged according to a 4×4 configuration and including modulatable detectors and wavelength multiplexing, in accordance with some embodiments of the technology described herein.

FIG. 6C is a block diagram of a photonic processor 620 arranged according to a 4×4 configuration and including modulatable detectors and wavelength multiplexing, in accordance with some embodiments of the technology described herein. Photonic processor 620 includes four light sources 10 (not shown) configured to produce light of two different wavelengths, $\lambda_1$ and $\lambda_2$. The received light from light sources 10 may be generated by two different light sources, each having a different wavelength, in some embodiments. Photonic processor 620 includes differential encoders 12 configured to encode numeric values $x_1$, $x_2$, $x_3$, and $x_4$ into the received light from light sources 10 and outputting respective pairs of dual-rail optical signals having different polarizations and wavelengths. The encoded optical signals from the top rail of each differential encoder 12 are multiplexed into a single waveguide by a wavelength multiplexer 63, and the encoded optical signals on the bottom rail of each differential encoder 12 are multiplexed by another wavelength multiplexer 63 into another waveguide.

In some embodiments, outputs of the wavelength multiplexers 63 are coupled to a binary splitter tree 65, and thereafter the multiplexed optical signals from the wavelength multiplexers 63 may be transmitted to multiple wavelength demultiplexers 65. The wavelength demultiplexers 65 are configured to demultiplex a received multiplexed optical signal into two separate waveguides (e.g., into two optical signals with two different wavelengths).

In some embodiments, pairs of demultiplexed optical signals (e.g., pairs of top rail or pairs of bottom rail optical signals) may thereafter be detected and modulated by a modulatable detector 624. The modulatable detectors 624 are configured to generate and output electrical signals (e.g., currents) representative of a product (y) of a vector (x) and a matrix element (M) based on the received optical signals from the wavelength demultiplexers 66. The output currents are thereafter combined by vias 56 and summed by circuitry 64, as previously described in connection with the example of FIG. 4, and output.

In some embodiments, the modulatable detectors 624 are optical detectors having at least one characteristic that can be controlled by a user using one or more electric control signals. The modulatable detectors 624 are designed so that the application of such a control signal (e.g., a voltage, current, or charge) alters a characteristic of the detector (e.g., the responsivity, gain, impedance, etc.). As a result, the photocurrent output by the modulatable detectors 624 depends not only on the received optical signals but also on the control signal applied to the detector. Additional aspects of modulatable detectors are described by U.S. Patent Application Publication No. 2021/0157878, titled "Linear Photonic Processors and Related Methods," filed on Nov. 23, 2020 and incorporated by reference herein in its entirety.

It should be appreciated that the photonic processors 500, 610, and 700 may similarly be adapted to include modulatable detectors 624 as photonic processor 600 was adapted in the example of photonic processor 620, as aspects of the technology described herein are not limited in this respect.

IV. Photonic Processors with Analog RF Domain Demultiplexing

Figure 7A:
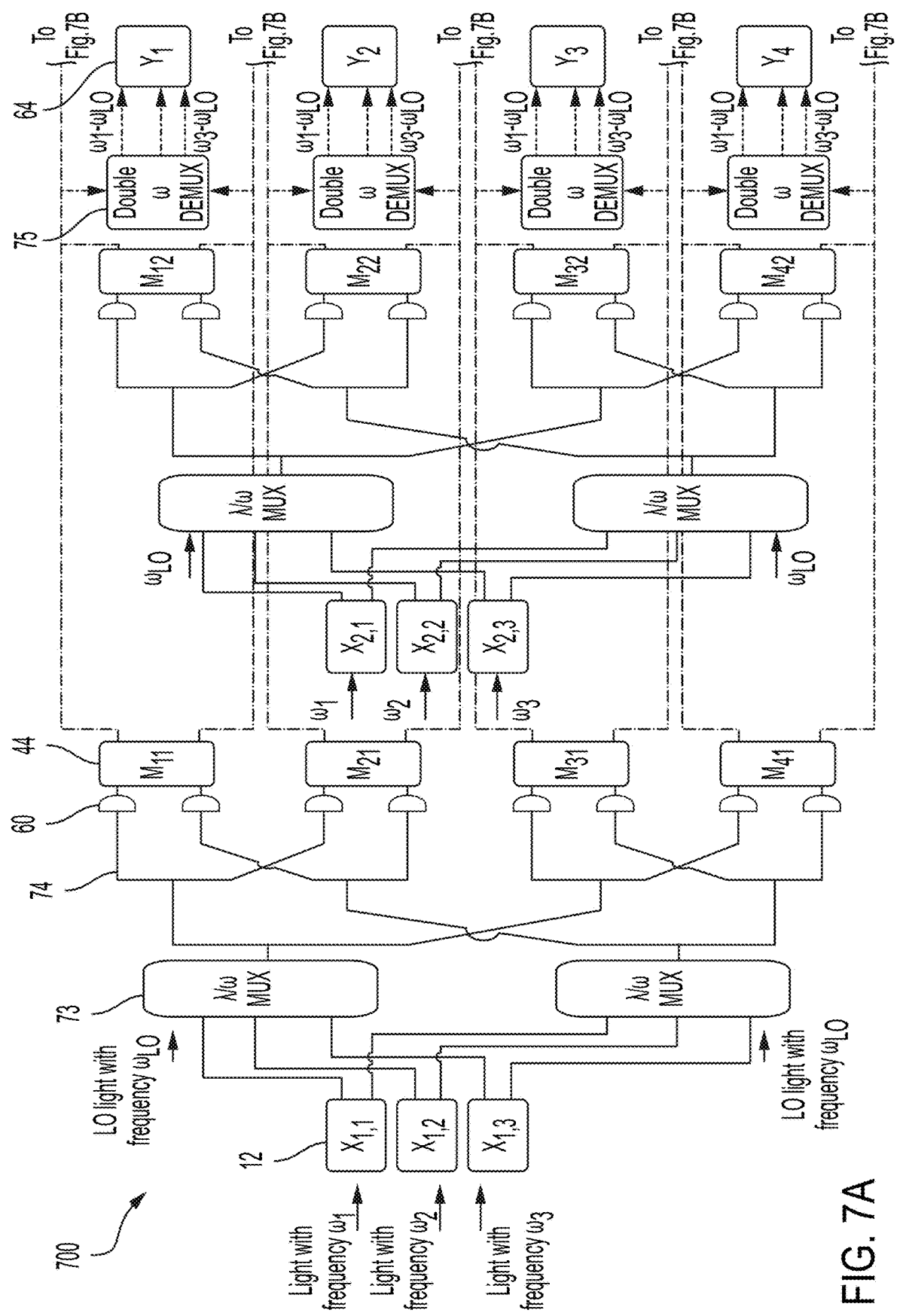
FIGS. 7A and 7B are a block diagram of a photonic processor arranged to perform matrix-matrix multiplication of a 4×3 matrix X and a 4×4 matrix M and including frequency multiplexing in the optical domain and frequency demultiplexing in the analog RF domain, in accordance with some embodiments of the technology described herein.
Figure 7B:
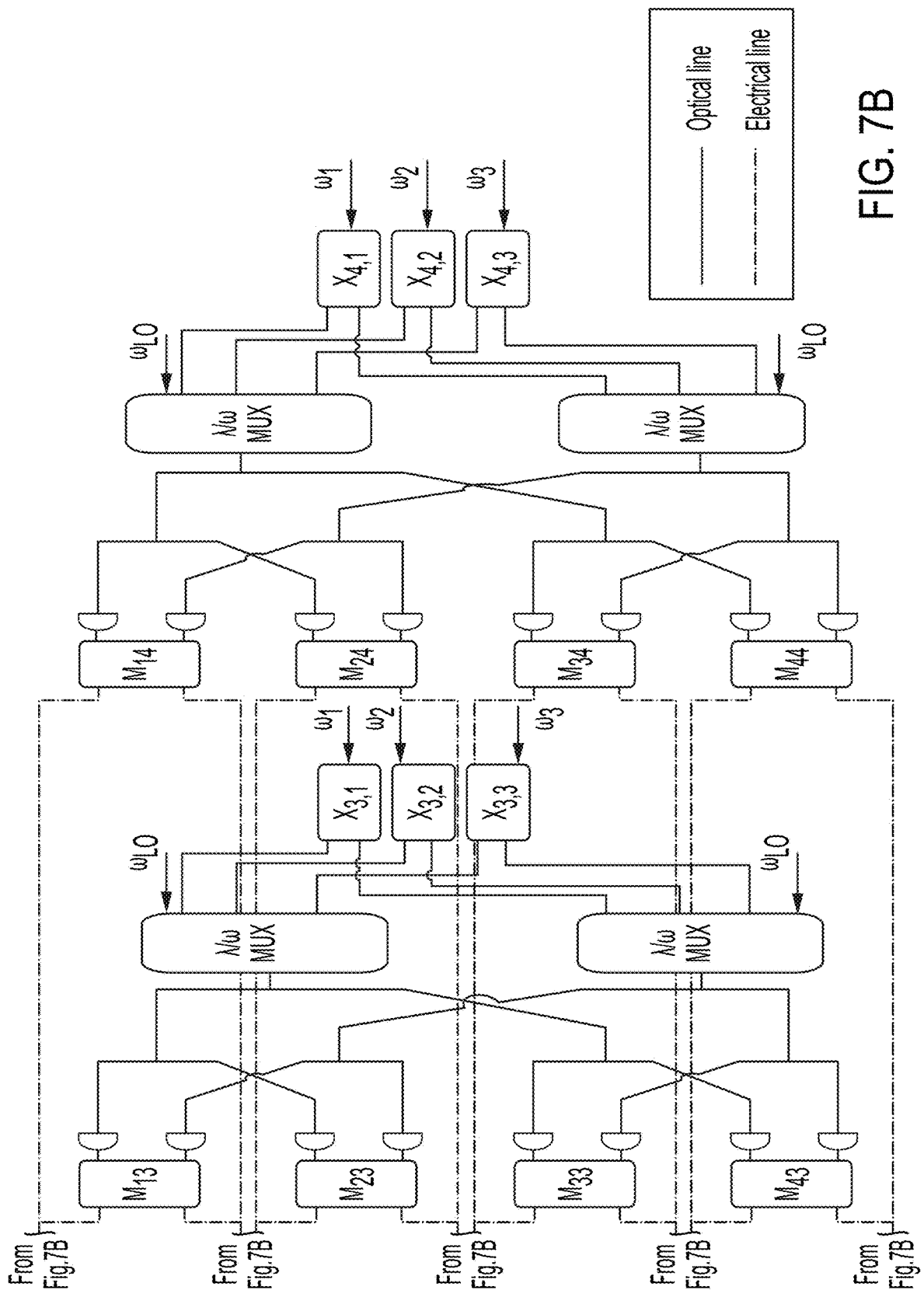

FIGS. 7A and 7B are a block diagram of a photonic processor 700 configured to perform matrix-matrix multiplication of a 4×3 matrix X and a 4×4 matrix M, in accordance with some embodiments of the technology described herein. The photonic processor 700 includes frequency multiplexing in the optical domain and frequency demultiplexing in the analog RF domain. The photonic processor 700 includes twelve light sources 10 (not shown) configured to input light of two or more different frequencies to the photonic processor 700. In some embodiments, the input light may be generated using three light sources, each having a different frequency. Input light of three different frequencies $\omega_1$, $\omega_2$, and $\omega_3$ are shown in the example of FIGS. 7A and 7B. The input light is received by respective differential optical encoders 12, each configured to encode a matrix element $x_{k,i}$ into an output encoded optical signal. Contrary to the operation of photonic processor 400 as described in connection with FIG. 4, each differential optical encoder 12 in photonic processor 700 is configured to encode the vector values $x_{k,i}$ into a difference between the absolute value of the amplitude of the light in the top rail ($|E_{k,i}^{(+)}| \propto \sqrt{I_{k,i}^{(+)}}$) and the absolute value of the amplitude of the light in the bottom rail ($|E_{k,i}^{(-)}| \propto \sqrt{I_{k,i}^{(-)}}$). Accordingly:

$$x_{k,i} \propto (\sqrt{I_{k,i}^{(+)}} - \sqrt{I_{k,i}^{(-)}}) \propto |E_{k,i}^{(+)}| - |E_{k,i}^{(-)}|.$$

Figures 8A, 8B:
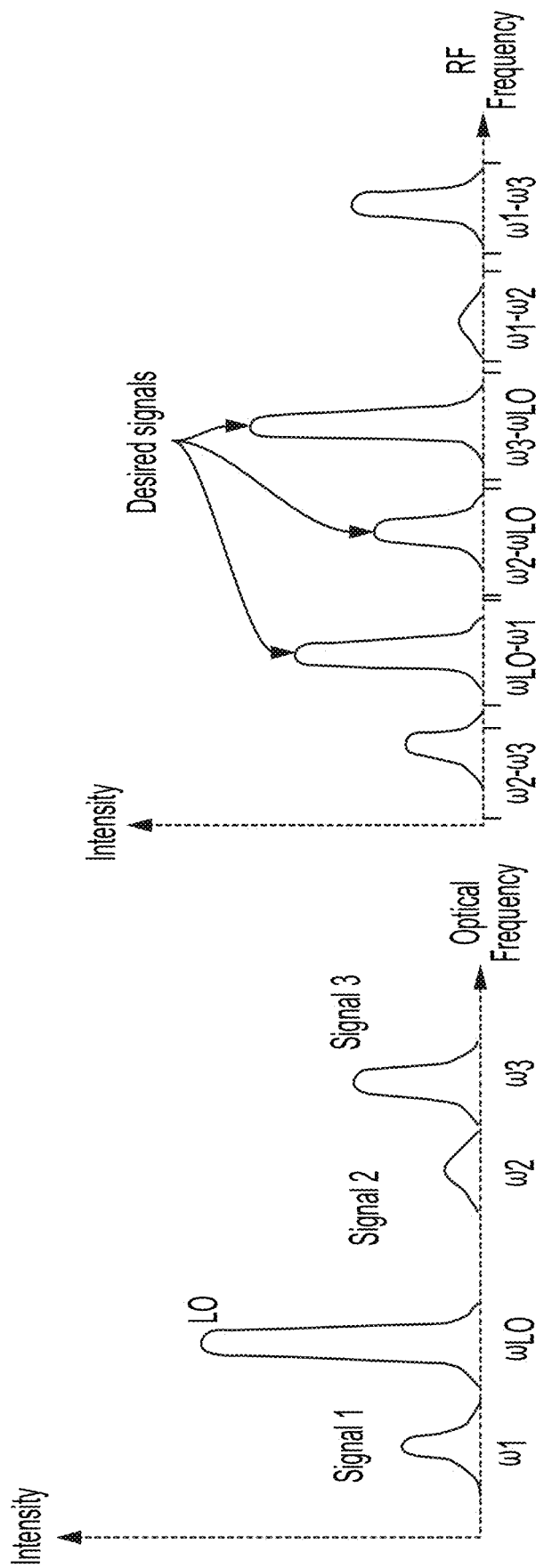
FIG. 8A is a plot showing an example of individual optical frequencies of a multiplexed optical signal, the individual optical frequencies including an optical frequency of a local oscillator (LO), in accordance with some embodiments of the technology described herein.
FIG. 8B is a plot showing the individual optical frequencies of FIG. 8A as encoded in the field amplitude of a multiplexed analog RF signal, in accordance with some embodiments of the technology described herein.

The encoded optical signals output by the differential optical encoders 12 are multiplexed into a single waveguide by frequency multiplexers 73. FIG. 8A shows an example of a multi-frequency, multiplexed optical signal output by frequency multiplexers 73 including individual optical frequencies $\omega_1$, $\omega_2$, $\omega_3$, and $\omega_{LO}$. The optical frequencies include the optical frequency of a local oscillator (LO), $\omega_{LO}$. In some embodiments, different frequencies of light may be used to encode the top rail (+) signal and the bottom rail (−) signal. One possible choice is to have frequency of light encoding the top (+) and bottom (−) signals to be encoded with frequencies on either side of the LO frequency (e.g., $|\omega_i^{(+)} - \omega_{LO}| = |\omega_i^{(-)} - \omega_{LO}|$ but $\omega_i^{(+)} \neq \omega_i^{(-)}$).

The additional optical signal from a local oscillator (LO) is multiplexed with the encoded optical signals from the differential optical encoders 12 to enable later demultiplexing in the analog RF domain. The frequency of the optical signal from the LO is different than the frequency of the encoded optical signals from the differential optical encoders 12. Accordingly, the total electric field present in the top (+) waveguide at the output of the $k^{th}$ column of the differential optical encoders 12 is:

$$E_k^{(+)} = E_{k,1}^{(+)}\cos(\omega_1 t + \phi_1^{(+)}) + E_{k,2}^{(+)}\cos(\omega_2 t + \phi_2^{(+)}) + \ldots +$$

-continued $$E_{k,N}^{(+)}\cos(\omega_N t + \phi_N^{(+)}) + E_{k,LO}\cos(\omega_{LO} t + \phi_{LO})$$

$$E_k^{(+)} = \sum_{i=1}^{N} E_{k,i}^{(+)}\cos(\omega_i t + \phi_i^{(+)}) + E_{LO}\cos(\omega_{LO} t + \phi_{LO})$$

where it is assumed that N different optical signal frequencies $\{\omega_1, \ldots, \omega_N\}$ are being multiplexed. Similarly, the total electric field present in the bottom (−) waveguide is given by:

$$E_k^{(-)} = \sum_{i=1}^{N} E_{k,i}^{(-)}\cos(\omega_i t + \phi_i^{(-)}) + E_{LO}\cos(\omega_{LO} t + \phi_{LO}).$$

It is assumed that the LO in the top waveguide and the bottom waveguide are identical with regards to amplitude, frequency, and/or phase. While this assumption simplifies the above expressions, in practice this assumption is not necessary because (1) the differential analog RF modulators 44 can normalize against the amplitude of the LO received in each arm, (2) the difference in frequency between the LO and the actual signal $E_i$ is important for demultiplexing the signals, and (3) the phase difference between the LO and signal will not be used.

At the detectors 60, there will be a total of N+1 optical signals of different frequencies, where the additional signal is from the LO. The photocurrent generated by the top rail (+) detectors 60 will therefore be:

$$i_k^{(+)} \propto |E_k^{(+)}|^2$$

$$|E_k^{(+)}|^2 = \frac{1}{2}\sum_{i=1}^{N} |E_{k,i}^{(+)}|^2 + \frac{1}{2}|E_{LO}|^2 +$$

$$\sum_{i,j(i\neq j)} |E_{k,i}^{(+)}||E_{k,j}^{(+)}|\cos((\omega_i - \omega_j)t + \phi_i^{(+)} - \phi_j^{(+)}) + \sum_{i=1}^{N} |E_{k,i}^{(+)}||E_{LO}|$$

$$\cos((\omega_i - \omega_{LO})t + \phi_i^{(+)} - \phi_{LO}).$$

The above equation is obtained after integrating and averaging out the fast optical frequency terms. In the equation above, there are four terms that will contribute to the current. The first term is the individual power of the optical signals and the second term is the individual power of the LO. The third term is the cross term between the different optical signals, and each particular cross term has a beat frequency of $(\omega_i-\omega_j)$. The fourth term is the cross term between each optical signal and the LO, and each cross term has a beat frequency of $(\omega_i-\omega_{LO})$. For the photocurrent generated by the bottom (−) detector, the exact calculation can be obtained by replacing all (+) by (−) in the above equation. FIG. 8B shows the encoded optical frequencies in the first currents output by detectors 60 of photonic processor 700. The optical frequencies are encoded in the field amplitude of the output analog RF signal by detectors 60 as described above.

A top rail (+) and bottom rail (−) detector 60 each pass a respective current signal to a differential analog RF modulator 44. The differential analog RF modulators 44 are configured to modulate the two photocurrents to generate second current signals, $\mu_{mk}i_k^{(+)}$ and $\mu_{mk}i_k^{(-)}$. The output second current signal at the top (+) electrical output is given by:

$$\mu_{mk}i_k^{(+)} \propto \frac{1}{2}\sum_{i=1}^{N} \mu_{mk}|E_{k,i}^{(+)}|^2 + \frac{1}{2}\mu_{mk}|E_{LO}|^2 +$$

$$\sum_{i,j(i\neq j)} \mu_{mk}|E_{k,i}^{(+)}||E_{k,j}^{(+)}|\cos((\omega_i - \omega_j)t + \phi_i^{(+)} - \phi_j^{(+)}) +$$

$$\sum_{i=1}^{N} \mu_{mk}|E_{k,i}^{(+)}||E_{LO}|\cos((\omega_i - \omega_{LO})t + \phi_i^{(+)} - \phi_{LO}).$$

The expression for the output second current signal at the bottom (−) electrical output, $\mu_{mk}i_k^{(-)}$, is similar and can be determined by substituting (−) superscripts for (+) superscripts in the above expression.

The output second current signals are then demultiplexed in the analog RF domain by the analog frequency demultiplexers 75 to obtain the desired multiplication between the matrix element $M_{mk}$ and the input vector element $x_{k,i}$:

$$M_{m,k}x_{k,i} \propto \mu_{mk}(|E_{k,i}^{(+)}|-|E_{k,i}^{(-)}|).$$

To demultiplex the second current signals, the signals $\mu_{mk}i_k^{(+)}$ can be mixed with a pure tone at frequency $(\omega_i-\omega_{LO})$ to obtain a DC electronic signal whose amplitude is proportional to $\mu_{mk}|E_{k,i}^{(+)}||E_{LO}|$.

Figure 9:
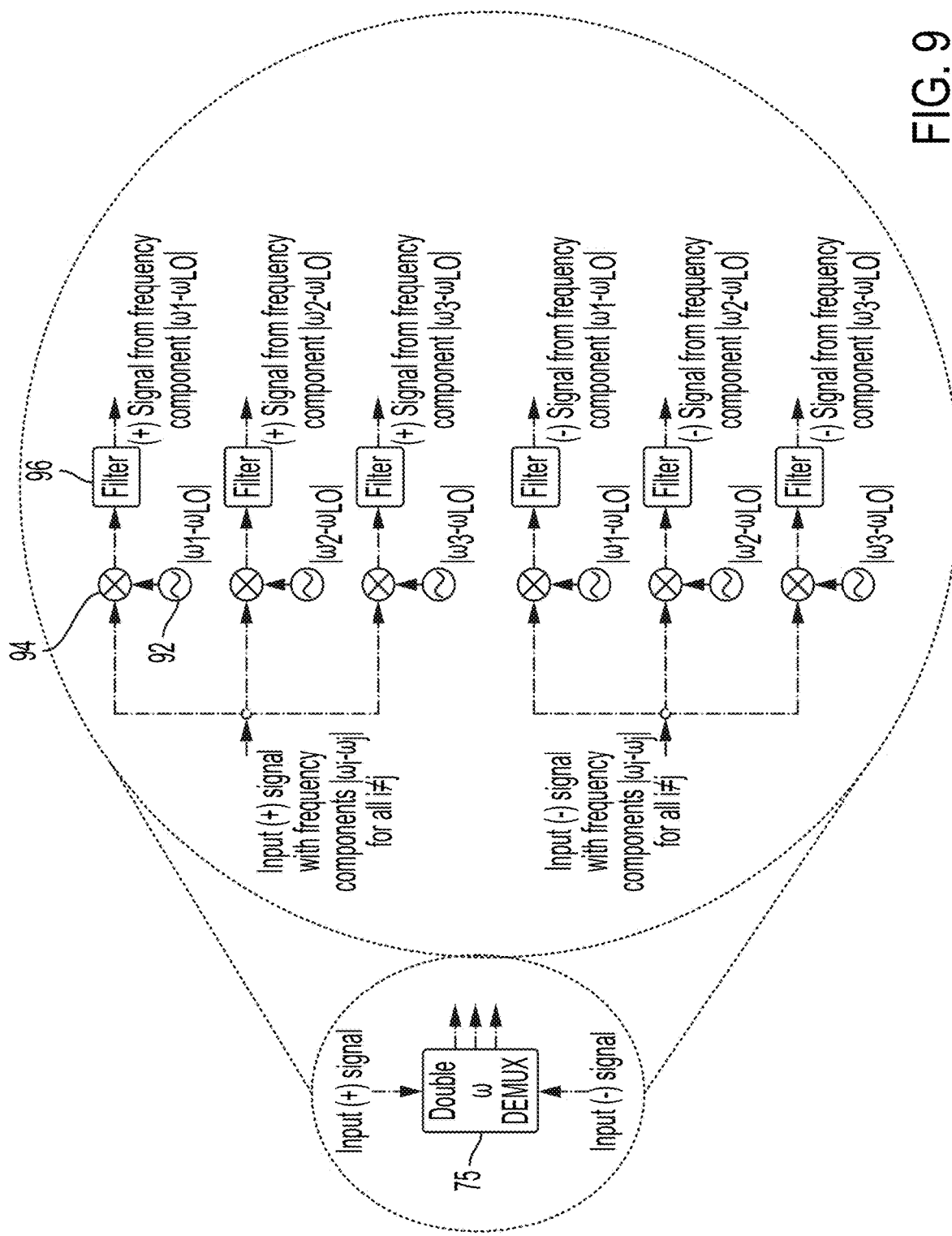
FIG. 9 is a block diagram of an example of circuitry configured to perform dual-rail demultiplexing in the analog RF domain, in accordance with some embodiments of the technology described herein.
Figure 10:
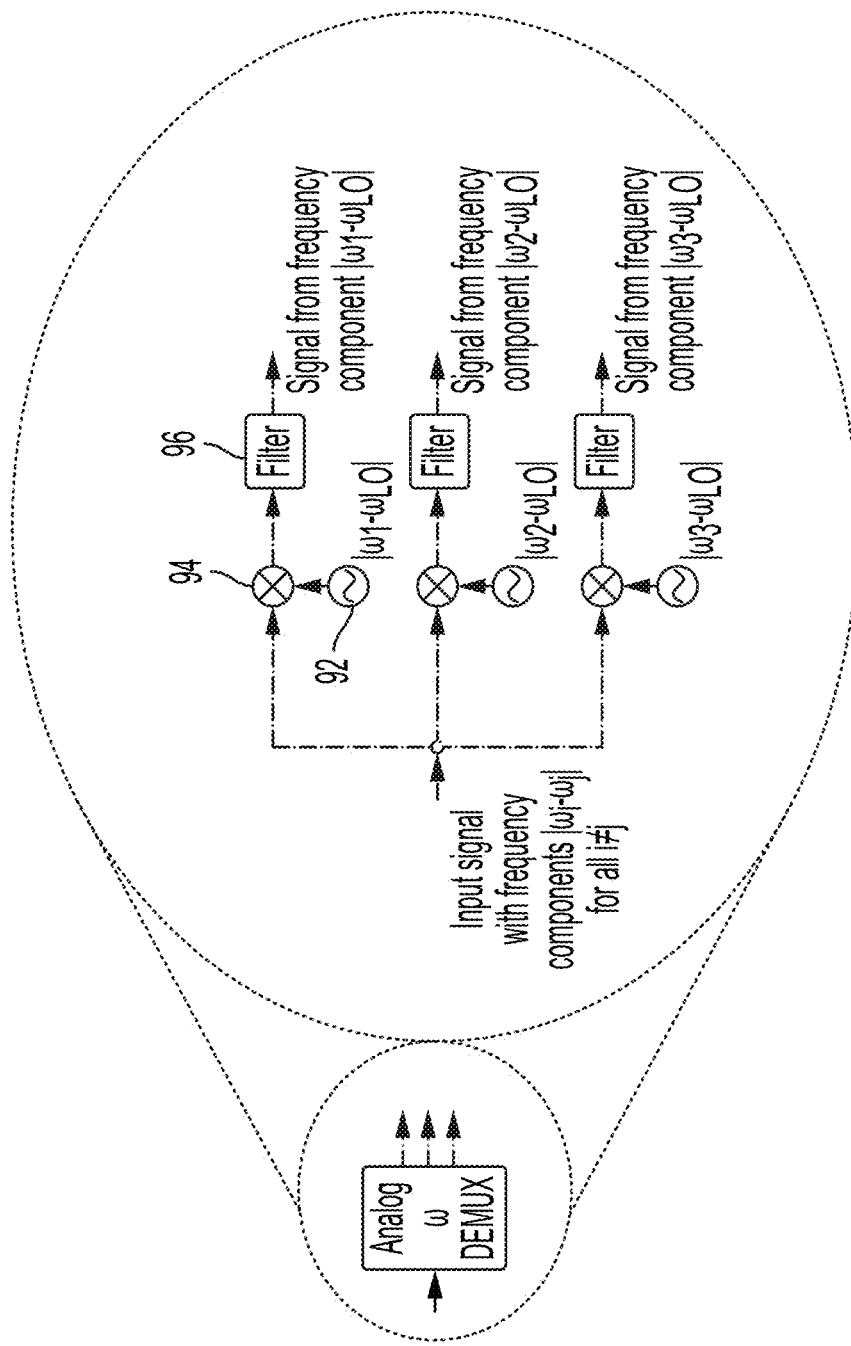
FIG. 10 is a block diagram of an example of circuitry configured to perform single-ended demultiplexing in the analog RF domain, in accordance with some embodiments of the technology described herein.

FIG. 9 shows an example of circuitry for performing the demultiplexing operations of analog frequency demultiplexers 75 using intermediate frequency (IF) mixing for a dual-rail signal. For a multi-rail signal, as with the dual-rail signal of photonic processor 700, the demultiplexing operation can be done in parallel by including the same circuitry for each rail. FIG. 10 shows an example circuitry for performing the demultiplexing operations in the analog RF domain using IF mixing and for a single-rail signal. For the single-ended example of FIG. 10, there is only a single connection between the optical encoders and the detectors and there is not a top (+) waveguide and bottom (−) waveguide).

The circuitry for both the examples of FIGS. 9 and 10 includes current sources 92 for introducing the pure tone frequencies $(\omega_i-\omega_{LO})$ with the received current signals from the differential analog RF modulators 44. The two signals are mixed by frequency mixer 94, and the output of frequency mixer 94 is filtered by filter 96. In some embodiments, the filter 96 may include any suitable filter including bandpass and/or digital filters.

The same demultiplexing operations are performed in the bottom (−) electronic signal output to obtain a DC electronic signal whose amplitude is proportional to $\mu_{mk}|E_{k,i}^{(-)}||E_{LO}|$. Because the relevant signal is encoded in the amplitude of the beat whose frequency is $(\omega_i-\omega_{LO})$, this beat frequency is unique to that signal alone. In other words, for this scheme to work, $(\omega_i-\omega_{LO})\neq(\omega_j-\omega_{LO})$ for any choice of i and j and $(\omega_i-\omega_{LO})\neq(\omega_j-\omega_k)$ for any choice of i, j, and k. Interestingly, and as should be appreciated from the above description, the output signal amplitude is proportional to the product of the amplitude of the encoded optical signal and the amplitude of the LO signal. Increasing the amplitude of the LO will accordingly boost the output signal-to-noise ratio (SNR) of all the signals.

To perform the summation of the different k values of $M_{jk}x_{k,i}$, the difference is taken between the second current signals in the analog RF domain. Thereafter, the k current signals $|E_{LO}|\,\mu_{jk}\,(|E_{k,i}^{(+)}|-|E_{k,i}^{(-)}|)$ are connected together using electrical wires to perform the desired summation.

The inventors have recognized that the design of photonic processor 700 as described in connection with the example of FIGS. 7A and 7B enables a highly parallelizable linear photonic processor. In particular, photonic processor 700 allows for the simultaneous multiplication of multiple input vectors. While the design of photonic processor 700 does require more differential optical encoders 12 and additional multiplexing and demultiplexing circuitries, which scale with the size of the input vectors, the design does not require any additional differential analog RF modulators 44, the number of which scales with the size of the input matrix M.

One additional design benefit of multiplexing the multi-frequency signals to propagate in a single waveguide is that all the optical signals at the different wavelengths are automatically phase-stable as long as the waveguides, the crossings, and the splitter components in the binary splitter tree 74 are not dispersive within the wavelength and/or frequency bandwidth of interest. All the frequency components pass through the same optical path from each photonic modulator to each photodetector. Therefore, any variation due thermal instability or other environmental effects that affect the phase stability of the binary splitter tree 74 in a dynamic manner will apply the same phase shift to each frequency signal equally. Phase stability between the different wavelengths is important because the signal is encoded in the interference between the LO and each optical signal.

It should be appreciated that demultiplexing may be performed between detectors 60 and differential analog RF modulators 44, in some embodiments. In such embodiments, the benefit of applying the same matrix element modulation to all the signals simultaneously is lost, but a more compact circuitry arrangement may be achieved that can increase the SNR or the bandwidth of the system as described in connection with the examples of FIGS. 5 and 6A.

Alternatively, it should be appreciated that demultiplexing may be performed to each individual output of the differential analog RF modulators 44, in some embodiments. In such embodiments, additional demultiplexing circuitry enables the demultiplexing of the output second current signals prior to the summation of the contributions from the k columns of detectors 60.

Figure 11:
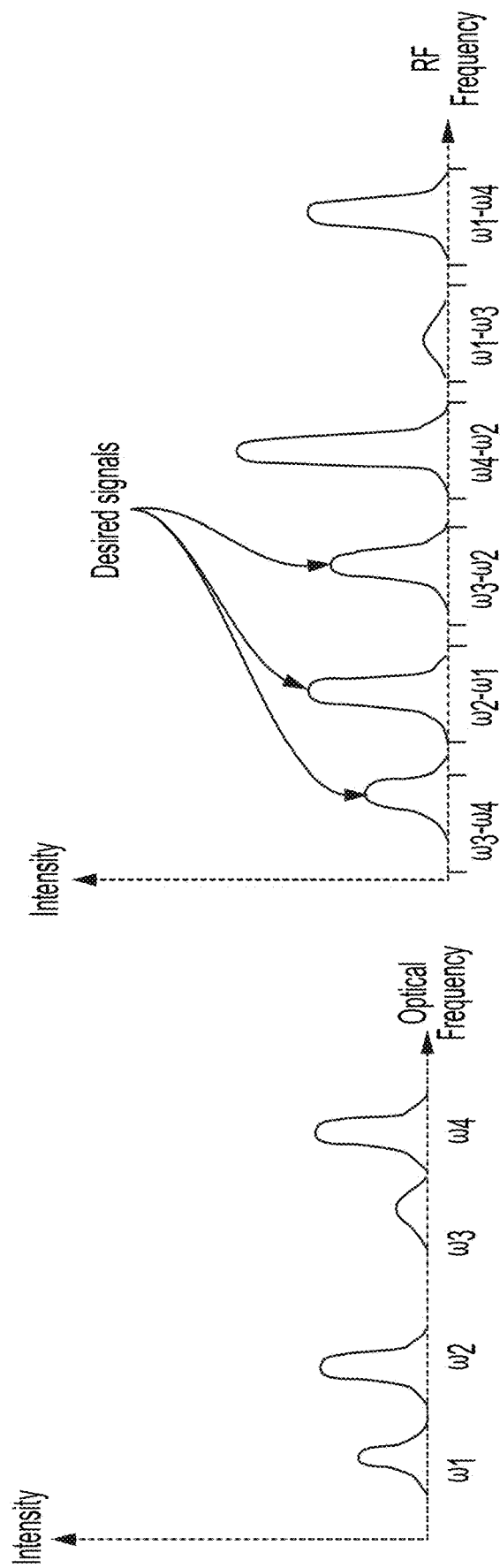
FIG. 11A is a plot showing individual optical frequencies of a multiplexed optical signal, the individual optical frequencies not including the frequency of an LO, in accordance with some embodiments of the technology described herein.
FIG. 11B is a plot showing the individual optical frequencies of FIG. 11A as encoded in the field amplitude of a multiplexed analog RF signal, in accordance with some embodiments of the technology described herein.

It should further be appreciated that in some embodiments it is not necessary to have a dedicated LO. In such embodiments, the input optical signals may be encoded to be in the cross amplitude multiplication between two electric fields (e.g., $x_i \propto |E_i||E_{i+1}|$ for i=1, ..., N). This alternative encoding is shown in FIGS. 11A and 11B. There are four different input optical frequencies, as shown in the example of FIG. 11A, and the signals are encoded in the multiplication of field amplitudes between neighboring optical frequencies (e.g., $(\omega_1, \omega_2)$, $(\omega_2, \omega_3)$, and $(\omega_3, \omega_4)$) as shown in FIG. 11B. The signals are encoded in the beat frequency of neighboring signals. Such a scheme has an advantage of keeping the relevant beat frequencies towards the lower end of the range of frequencies, which is useful when using analog RF components whose bandwidths are limited to the hundreds of gigahertz.

It should further be appreciated that the architectures of photonic processors 500 and 600 do not prevent the implementation of the architecture of photonic processor 700. One could reasonably perform all-optical multiplexing/demultiplexing using the polarization DOF and thereafter perform demultiplexing in the analog RF domain using the wavelength DOF, or vice versa. Alternatively, one could design a photonic processor where some wavelengths are demultiplexed in the optical domain as done in photonic processors 500 and 600 and some wavelengths are demultiplexed in the analog RF domain as implemented in photonic processor 700.

It should be appreciated that while photonic processors 500, 600, 610, 620, and 700 are shown arranged to accommodate a 4×4 matrix for simplicity, that photonic processors may generally be arranged to accommodate any N×N matrix. For example, in some embodiments, the photonic processor may be arranged to accommodate a 64×64 matrix, a 128×128 matrix, and/or a 256×256 matrix.

It should be appreciated that photonic processors 500, 600, and 700, while shown as dual-rail photonic processors, may also be implemented as single-ended photonic processors as described herein in connection with photonic processor 610.

Figure 12:
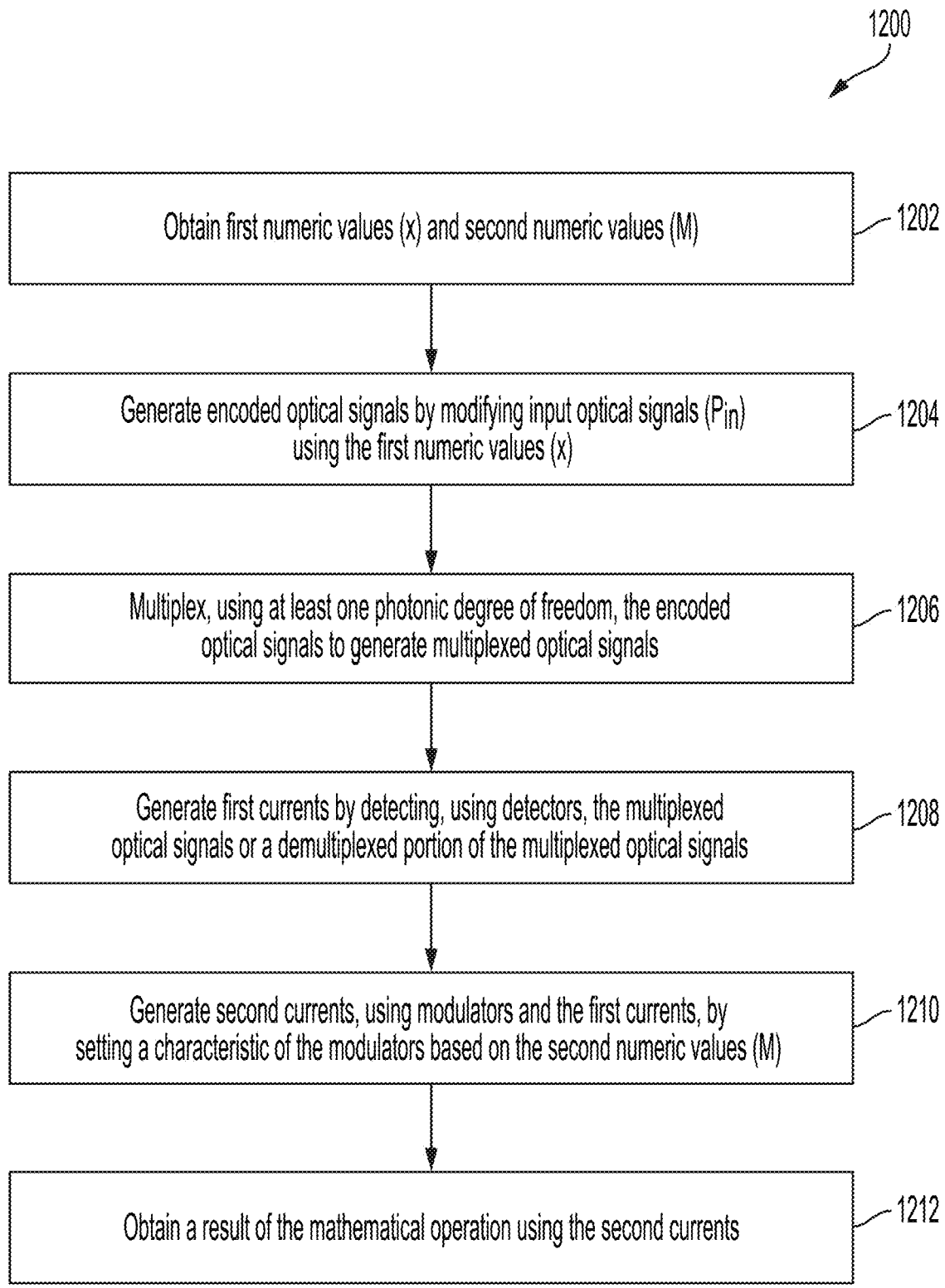
FIG. 12 is a flow chart illustrating a method for performing multiplication operations using a photonic processor including multiplexing using one or more photonic degrees of freedom, in accordance with some embodiments of the technology described herein.

FIG. 12 is a flow chart illustrating a method 1200 for performing multiplication operations using a photonic processor (e.g., photonic processor 500, 600, and/or 700) including multiplexing using one or more photonic DOFs, in accordance with some embodiments of the technology described herein. Method 1200 can be performed using any suitable photonic processor, including the photonic processors 500, 600, 610, 620, and 700 as described in connection with FIGS. 5, 6A, 6B, 6C, and 7A and 7B herein, or any suitable variations on the same.

Method 1200 begins at act 1202, in which the photonic processor obtains first numeric values and second numeric values. Referring to the example of the architecture of FIG. 1, at act 1202, the numeric value unit 18 generates first numeric values (e.g., vector values x) and second numeric values (e.g., matrix values M) based on data stored in a memory of controller 17 and/or on data obtained from another computing system. The numeric values need not be obtained simultaneously. These numeric values may represent any type of information, such as text, audio, video, imagery, etc. The numeric values may be real or complex and positive or negative values.

Thereafter, method 1200 proceeds to act 1204, in which encoded optical signals are generated by modifying input optical signals using the first numeric values. Referring to the example of the architecture of FIGS. 7A and 7B, the differential optical encoders 12 generate encoded optical signals by modulating the input optical signals (e.g., the light with frequencies $\omega_1$, $\omega_2$, and $\omega_3$) based on a received first numeric value x. For example, in a dual-rail photonic processor, the differential optical encoders 12 may encode the first numeric value x such that the first numeric value x is proportional to a difference (e.g., a difference in power or amplitude) between a top (+) and bottom (−) output optical signal. In some embodiments (e.g., single-ended embodiments), the first numeric value x may be encoded into a single encoded optical signal (e.g., into a polarization of the optical signal).

After performing act 1204, method 1200 proceeds to act 1206. At act 1206, the encoded optical signals are multiplexed using at least one photonic DOF to generate multiplexed optical signals. For example, the encoded optical signals may be multiplexed based on their polarization (e.g., as described in connection with photonic processor 500), their wavelength (e.g., as described in connection with photonic processor 600), and/or their frequency (e.g., as described in connection with photonic processor 700).

The multiplexed optical signals are then transmitted through single waveguides and/or binary splitter trees (e.g. binary splitter trees 54, 65, 74) to detectors (e.g., detectors 60) at act 1208. At act 1208, the detectors generate first currents by detecting and converting received optical signals into currents (e.g., photocurrents). In some embodiments, the detectors 60 receive and convert the multiplexed optical signals from the multiplexer (e.g., multiplexers 73) of the photonic processor. In some embodiments, the detectors 60 receive and convert a demultiplexed portion of the multiplexed optical signals from a demultiplexer (e.g., demultiplexers 55, 66).

After generating the first currents in act 1208, method 1200 proceeds to act 1210. At act 1210, second current signals are generated by, for example, differential analog RF modulators 44. In some embodiments, the differential analog RF modulators 44 generate a pair of second current signals by modulating the first current signals using the second numeric values M. In some embodiments (e.g., single-ended embodiments), a respective analog RF modulator may modulate a single received first current signal using a second numeric value M.

Method 1200 then proceeds to act 1212, in which a result of the mathematical operation is obtained using the second current signals generated by the differential analog RF modulators 44. In some embodiments, act 1212 includes receiving one or more second current signals (e.g., using a trans-impedance amplifier to obtain an output voltage) and converting the output signal using an analog-to-digital converter to obtain a numeric value representing the result (e.g., the product of a first numeric value x and a second numeric value M).

Having thus described several aspects of at least one embodiment of this technology, it is to be appreciated that various alterations, modifications, and improvements will readily occur to those skilled in the art.

Various aspects of the technology described herein may be used alone, in combination, or in a variety of arrangements not specifically described in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the technology described herein may be embodied as a method, examples of which are provided herein including with reference to FIG. 5. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value.

What is claimed is:

1. A photonic processor, comprising:
a device configured to perform matrix-matrix multiplication, comprising:
a multiplexer configured to multiplex, using at least one photonic degree of freedom, multiple encoded optical signals into a multiplexed optical signal;
a detector coupled to an output of an optical path including the multiplexer, wherein the detector is configured to generate a first current based on the multiplexed optical signal; and
a modulator coupled to an output of the detector and configured to generate a second current by modulating the first current, wherein the second current is representative of a portion of a result of the matrix-matrix multiplication.

2. The photonic processor of claim 1, wherein the at least one photonic degree of freedom is one of a selection of wavelength, frequency, or polarization.

3. The photonic processor of claim 1, further comprising a demultiplexer configured to demultiplex the multiplexed optical signal.

4. The photonic processor of claim 3, wherein the multiplexer is configured to multiplex in an optical domain and the demultiplexer is configured to demultiplex in the optical domain.

5. The photonic processor of claim 1, further comprising a demultiplexer configured to demultiplex the second current.

6. The photonic processor of claim 5, wherein the multiplexer is configured to multiplex in an optical domain and the demultiplexer is configured to demultiplex in an RF domain.

7. The photonic processor of claim 1, wherein the photonic processor is a dual rail photonic processor.

8. The photonic processor of claim 1, wherein the photonic processor is single-ended.

9. The photonic processor of claim 1, wherein performing matrix-matrix multiplication comprises performing matrix-vector multiplication.

10. The photonic processor of claim 1, wherein the multiplexer, the detector and the modulator are disposed on a common semiconductor substrate.

11. A method for performing a mathematical operation, the method comprising:
performing matrix-matrix multiplication between a first matrix and a second matrix, wherein performing the matrix-matrix multiplication comprises:
obtaining first numeric values representing at least a portion of the first matrix and second numeric values representing at least a portion of the second matrix;
generating encoded optical signals by modifying input optical signals using the first numeric values;
multiplexing, using at least one photonic degree of freedom, the encoded optical signals to generate multiplexed optical signals;
generating first currents by detecting, using detectors, the multiplexed optical signals; and generating second currents, using modulators and the first currents, by setting a characteristic of the modulators based on the second numeric values, wherein the second currents represent a portion of a result of the matrix-matrix multiplication; and obtaining a result of the matrix-matrix multiplication using the second currents.

12. The method of claim 11, wherein multiplexing using at least one photonic degree of freedom comprises multiplexing using at least one of a selection of wavelength, frequency, or polarization.

13. The method of claim 11, further comprising demultiplexing the multiplexed optical signals.

14. The method of claim 11, further comprising demultiplexing the second currents.

15. The method of claim 11, wherein the first matrix is a vector.

16. A photonic processor, comprising:
a device configured to perform matrix-matrix multiplication, comprising:
  a multiplexer configured to multiplex, using at least one photonic degree of freedom, multiple encoded optical signals into a multiplexed optical signal;
  a demultiplexer configured to demultiplex the multiplexed optical signal using the at least one photonic degree of freedom;
  a detector coupled to an output of an optical path including the multiplexer, wherein the detector is configured to generate a first current based on the demultiplexed optical signal; and
  a modulator coupled to an output of the detector and configured to generate a second current by modulating the first current, wherein the second current represents a portion of a result of the matrix-matrix multiplication.

17. The photonic processor of claim 16, wherein the at least one photonic degree of freedom is one of a selection of wavelength, frequency, or polarization.

18. The photonic processor of claim 16, wherein the photonic processor is a dual rail photonic processor.

19. The photonic processor of claim 16, wherein performing matrix-matrix multiplication comprises performing matrix-vector multiplication.

* * * * *